(12) United States Patent
Burtt et al.

(10) Patent No.: US 10,577,125 B1
(45) Date of Patent: Mar. 3, 2020

(54) MULTI-ROTOR AIRCRAFT INCLUDING A SPLIT DUAL HEMISPHERICAL ATTACHMENT APPARATUS FOR VIRTUAL REALITY CONTENT CAPTURE AND PRODUCTION

(71) Applicant: VR DRONES LLC, Lake Oswego, OR (US)

(72) Inventors: Stephen A. Burtt, Milwaukie, OR (US); Mark R. Dana, Lake Oswego, OR (US); Lawrence A. Dennis, III, Portland, OR (US)

(73) Assignee: VR DRONES LLC, Lake Oswego, OR (US)

( * ) Notice: Subject to any disclaimer, the term of this patent is extended or adjusted under 35 U.S.C. 154(b) by 432 days.

(21) Appl. No.: 15/390,427

(22) Filed: Dec. 23, 2016

Related U.S. Application Data

(60) Provisional application No. 62/271,765, filed on Dec. 28, 2015.

(51) Int. Cl.
| | | |
|---|---|---|
| *B64D 47/08* | (2006.01) | |
| *B64C 39/02* | (2006.01) | |
| *G03B 17/56* | (2006.01) | |
| *G03B 37/04* | (2006.01) | |

(Continued)

(52) U.S. Cl.
CPC ............ *B64D 47/08* (2013.01); *B64C 39/024* (2013.01); *G03B 15/006* (2013.01); *G03B 17/561* (2013.01); *G03B 37/04* (2013.01); *G06T 11/60* (2013.01); *B64C 2201/108* (2013.01); *B64C 2201/127* (2013.01); *G06T 2207/20221* (2013.01)

(58) Field of Classification Search
CPC ............................ B64D 47/108; B64D 47/08; B64C 2201/127; G03B 15/006
See application file for complete search history.

(56) References Cited

U.S. PATENT DOCUMENTS

| | | | | |
|---|---|---|---|---|
| 8,279,266 | B2 * | 10/2012 | Theobald | H04N 7/181 348/36 |
| 9,152,019 | B2 | 10/2015 | Kintner | |
| 9,609,234 | B1 * | 3/2017 | Checka | H04N 5/247 |
| 9,921,464 | B1 * | 3/2018 | Choi | G02B 27/64 |

(Continued)

*Primary Examiner* — Magdalena Topolski
(74) *Attorney, Agent, or Firm* — Renaissance IP Law Group, LLP; David A. Crowther

(57) ABSTRACT

A multi-rotor aircraft including a split dual hemispherical attachment apparatus for virtual reality content capture and production. One or more hemispherical attachment assemblies can include camera receptacles to receive and secure multiple cameras, sensors, and/or other detectors. The relative positioning of the cameras eliminates any parallax point or view of a propeller within the video content, even though they are disposed in closer proximity, which enables the production of high-quality virtual reality content. The split dual hemispherical attachment apparatus can be coupled to a stabilization device mounted on the multi-rotor aircraft to reduce or eliminate remaining vibration and vertigo effects. The split dual hemispherical attachment apparatus disclosed herein permits interchangeability of various kinds of holders and receptacles for the various kinds of cameras, sensors, and/or detectors. The multi-rotor aircraft can include logic for supporting real time capture and post-processing of virtual reality content.

8 Claims, 37 Drawing Sheets

(51) Int. Cl.
*G06T 11/60* (2006.01)
*G03B 15/00* (2006.01)

(56) References Cited

U.S. PATENT DOCUMENTS

| | | | |
|---|---|---|---|
| 10,104,289 B2* | 10/2018 | Enriquez | H04N 5/23238 |
| 10,230,904 B2* | 3/2019 | Cabral | H04N 5/23206 |
| 2004/0246333 A1* | 12/2004 | Steuart, III | G03B 35/08 |
| | | | 348/36 |
| 2007/0081091 A1* | 4/2007 | Pan | A61B 1/00165 |
| | | | 348/335 |
| 2007/0206945 A1* | 9/2007 | DeLorme | G03B 41/00 |
| | | | 396/332 |
| 2011/0069148 A1* | 3/2011 | Jones | H04N 5/232 |
| | | | 348/36 |
| 2012/0154521 A1* | 6/2012 | Townsend | H04N 5/23238 |
| | | | 348/36 |
| 2014/0153916 A1 | 6/2014 | Kintner | |
| 2014/0240498 A1* | 8/2014 | Ohtomo | B64D 47/08 |
| | | | 348/144 |
| 2015/0032295 A1 | 1/2015 | Stark et al. | |
| 2016/0349600 A1* | 12/2016 | Macmillan | G03B 17/561 |
| 2016/0352982 A1* | 12/2016 | Weaver | H04N 5/23238 |
| 2017/0045807 A1* | 2/2017 | Ye | G03B 17/561 |
| 2017/0299949 A1* | 10/2017 | Donaldson | G03B 17/02 |
| 2018/0002035 A1* | 1/2018 | Neely | B64D 47/08 |
| 2018/0004064 A1* | 1/2018 | Kim | G03B 17/561 |
| 2018/0141647 A1* | 5/2018 | Suzuki | B64C 27/08 |
| 2018/0155024 A1* | 6/2018 | Lee | B64D 47/08 |
| 2018/0321580 A1* | 11/2018 | Niewohner | F16M 13/02 |
| 2019/0002124 A1* | 1/2019 | Garvin | B64D 47/08 |

* cited by examiner

MULTI-ROTOR AIRCRAFT INCLUDING A SPLIT DUAL HEMISPHERICAL ATTACHMENT APPARATUS FOR VIRTUAL REALITY CONTENT CAPTURE AND PRODUCTION

RELATED APPLICATION DATA

This application claims the benefit of co-owned U.S. Application No. 62/271,765, filed on Dec. 28, 2015, which is hereby incorporated by reference.

TECHNICAL FIELD

This application pertains to virtual reality and multi-rotor aircraft, and more particularly, to a split hemispherical attachment apparatus attachable to a multi-rotor aircraft to enable the capturing of stable and seamless content from a moving multi-rotor aircraft, which can be used to produce virtual reality content.

BACKGROUND

Virtual reality permits a user to see content through a viewing device that displays a recorded scene in such a way as to see the space around them as they point their eyes in all directions. Content for such scenes is captured using cameras attached to remote controlled multi-rotor aircrafts, sometimes referred to as "drones" or "copters." Conventionally, the video content is then post-processed in a separate computer workstation and stitched together to arrive at the finished product.

Conventional camera attachment assemblies are limited in effectiveness due to their mounting of the multiple cameras far away from each other, outside the view of any propeller, in an attempt to avoid views of the propellers within the captured content. This creates problems with image overlap and seams that are difficult or impossible to remedy in subsequent post-processing of the captured and stitched video content. In addition, when using conventional techniques, a parallax point exists beneath the aircraft, which obstructs the view of the user within a portion of the stitched video content. Yet another drawback of the current technology is that the extended mounting of the cameras adds vibration to the recorded scene, making it unattractive for commercial use.

Accordingly, a need remains for an improved attachment apparatus for multi-rotor aircraft and associated content capture and virtual reality content production methods. Embodiments of the inventive concept address these and other limitations in the prior art.

Figure 1:
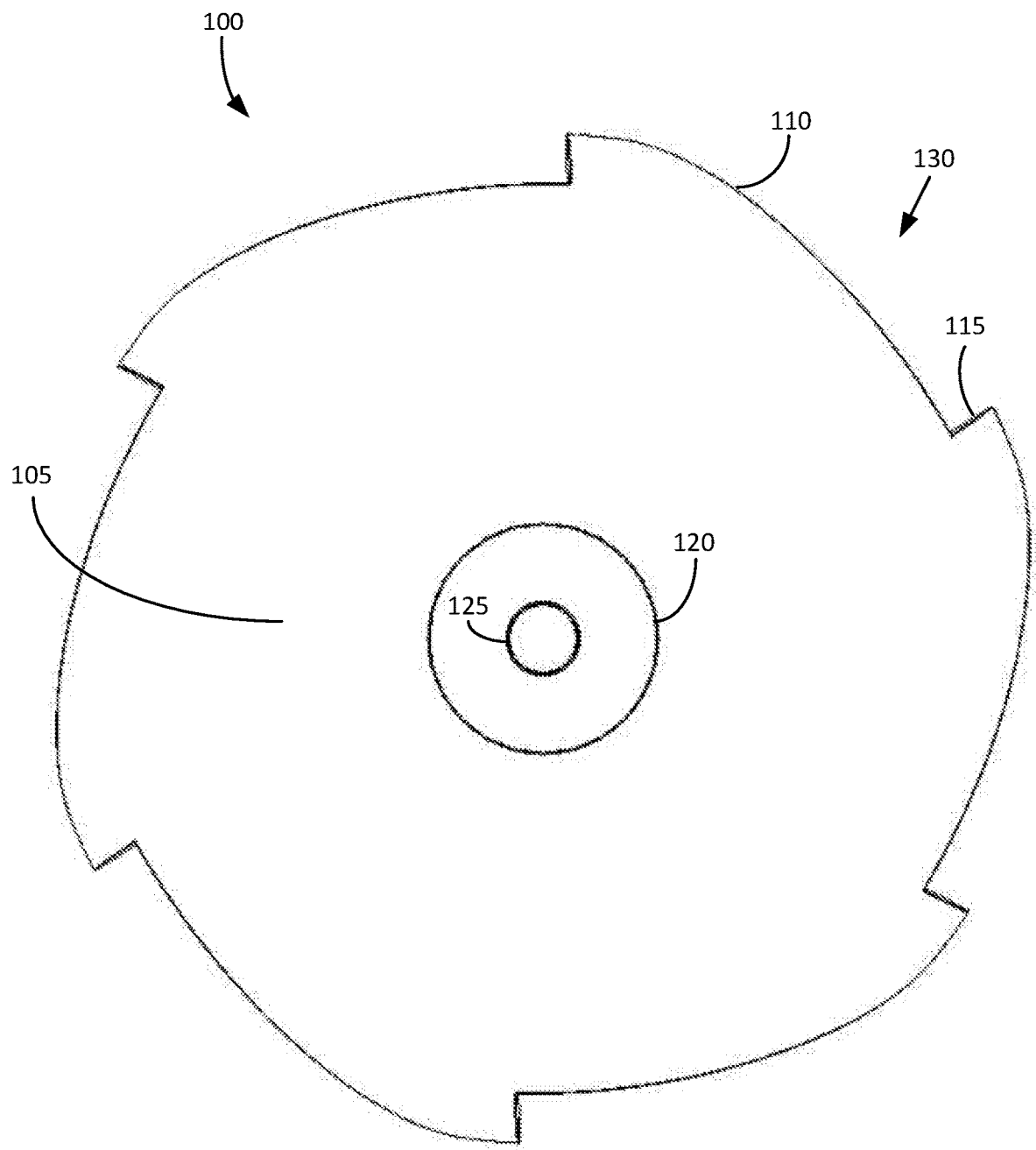
FIG. 1 illustrates a bottom view of an example hemispherical base of a split dual hemispherical attachment assembly of a multi-rotor aircraft in accordance with various embodiments of the present inventive concept.

The foregoing and other features of the inventive concept will become more readily apparent from the following detailed description, which proceeds with reference to the accompanying drawings.

DETAILED DESCRIPTION OF THE EMBODIMENTS

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first camera attachment could be termed a second camera attachment, and, similarly, a second camera attachment could be termed a first camera attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the inventive concept include a multi-rotor aircraft including a split dual hemispherical attachment apparatus for virtual reality content capture and production. The multi-rotor aircraft is sometimes referred to as a "drone" or "copter." Although referred to herein as a "split dual hemispherical" attachment apparatus, it will be understood that the attachment apparatus can be of a "split dual cone" configuration, a "split dual cube" configuration, a "split dual pyramid," a "split dual carousel," or the like, as further described below.

Some embodiments include a system and method for capturing and producing virtual reality video content. The split dual hemispherical attachment apparatus can accommodate multiple cameras, sensors, and/or other detectors for capturing video content, still images, infrared images, radar images, LIDAR information, or other types of content, which can be combined to form virtual reality content. The receptacles described herein can be configured to receive and secure cameras, sensors, and/or other detectors for capturing video content, still images, infrared images, or other types of content. Although the term "camera" is generally used herein, it will be understood that other such sensors or detectors, such as infrared detectors, radar detectors, LIDAR sensors, or the like, can be used in place of the cameras without departing from the inventive concepts disclosed herein.

The split dual hemispherical attachment apparatus disclosed herein provides for closer proximity of the cameras, detectors, or other sensors relative to each other, thereby permitting a more complete and stable recording. The relative positioning of the cameras, sensors, and/or other detectors eliminates any view of a propeller within the video content, even though they are disposed in closer proximity. Accordingly, seamless content that eliminates any parallax point and propellers within the view can be captured and used to produce high quality virtual reality content.

Embodiments disclosed herein reduce the time needed for the otherwise time-consuming post-processing of the captured video. The split dual hemispherical attachment apparatus can be coupled to a stabilization device mounted on the multi-rotor aircraft to reduce or eliminate remaining vibration and vertigo effects. The stabilization device can be coupled to a vertical support beam that passes through a central platform that is coupled to the multi-rotor aircraft. The end result is virtual reality video content that provides a sense of floating or flying without visible evidence of how the moving content was captured, further adding to the realism for the user.

The split dual hemispherical attachment apparatus disclosed herein is not limited to the mounting of just one style of camera. The portion of the split dual hemispherical attachment apparatus that holds the camera, sensor, and/or other detector can house a wide variety of small lightweight content capture devices. Such content capture devices can include, for example, visible light cameras, infrared cameras, video cameras, still shot cameras, radar detectors, LIDAR sensors, hyperspectral sensors, thermal sensors, or other suitable sensors, cameras, and/or detectors. The split dual hemispherical attachment apparatus disclosed herein permits interchangeability of various kinds of holders for the various kinds of cameras, sensors, and/or detectors.

The split dual hemispherical attachment apparatus can be comprised of glass-filled Acrylonitrile butadiene styrene (ABS) plastic composite. Other suitable strong and lightweight materials can be used such as carbon fiber tubing, fiberglass, carbon fiber reinforced polymer or plastic, plastic injected parts, metal parts such as aluminum, or the like. Some of the parts of the attachment apparatus can be made of one material, while other parts can be made of another material. Some of the parts of the split dual hemispherical attachment apparatus are interchangeable and easily replaced if damaged.

FIG. 1 illustrates a bottom view of an example hemispherical base 100 of a split dual hemispherical attachment assembly of a multi-rotor aircraft in accordance with various embodiments of the present inventive concept. In some embodiments, an inside of the hemispherical base 100 is solid throughout. In some embodiments, an inside of the hemispherical base is hollow.

The hemispherical base 100 can include receptacle notches 130. Multiple receptacle notches 130 can be disposed around a perimeter of the hemispherical base 100. Each of the receptacle notches 130 can include a radial sidewall 115 extending in substantially a radial direction from a center region 120 of the hemispherical base 100. In addition, an outer edge 110 can define an outer perimeter of each of the receptacle notches 130.

The hemispherical base 100 can include a hemispherical surface 105. The hemispherical surface 105 can culminate at a vertical support beam attachment section 120 in the center region of the hemispherical base 100. The vertical support beam attachment section 120 can include a vertical support beam receptacle 125, which can be a screw hole, a cylindrical column, or the like. The vertical support beam attachment section 120 can receive a vertical support beam, as further described below.

Figure 2:
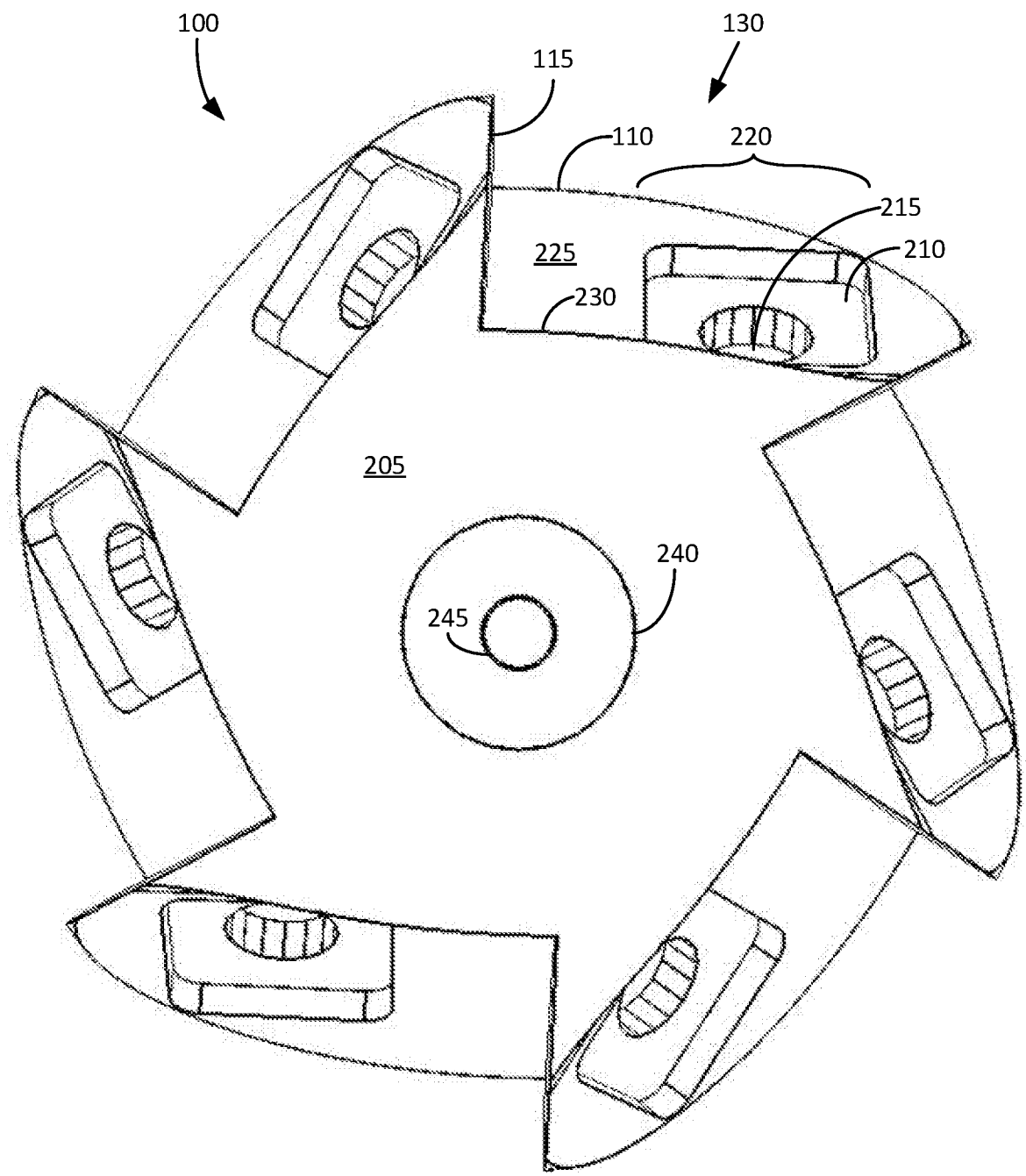
FIG. 2 illustrates a top view of the hemispherical base of FIG. 1 in accordance with various embodiments of the present inventive concept.
Figure 3:
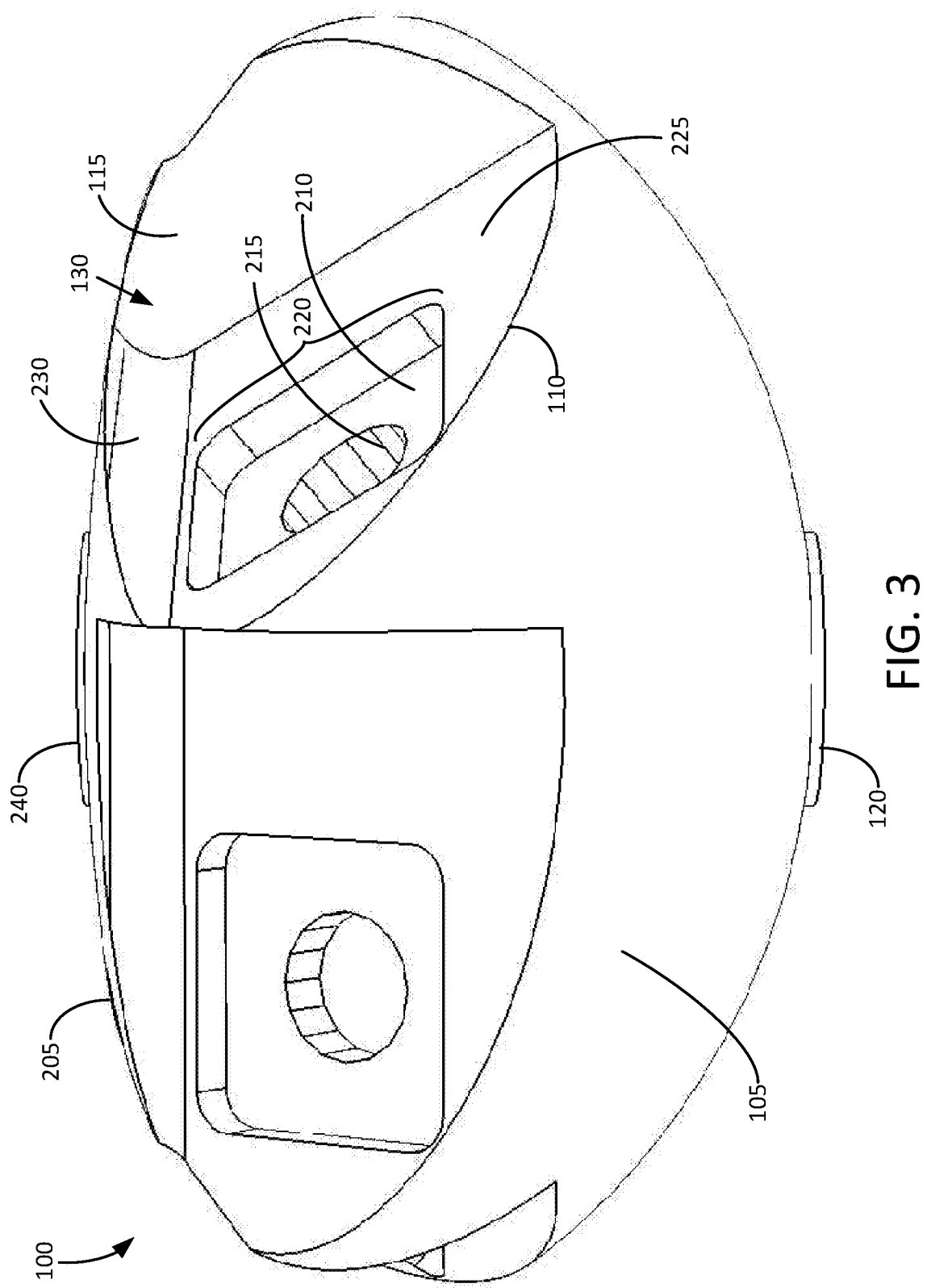
FIG. 3 illustrates a side elevation view of the hemispherical base of FIG. 1 in accordance with various embodiments of the present inventive concept.
Figure 4:
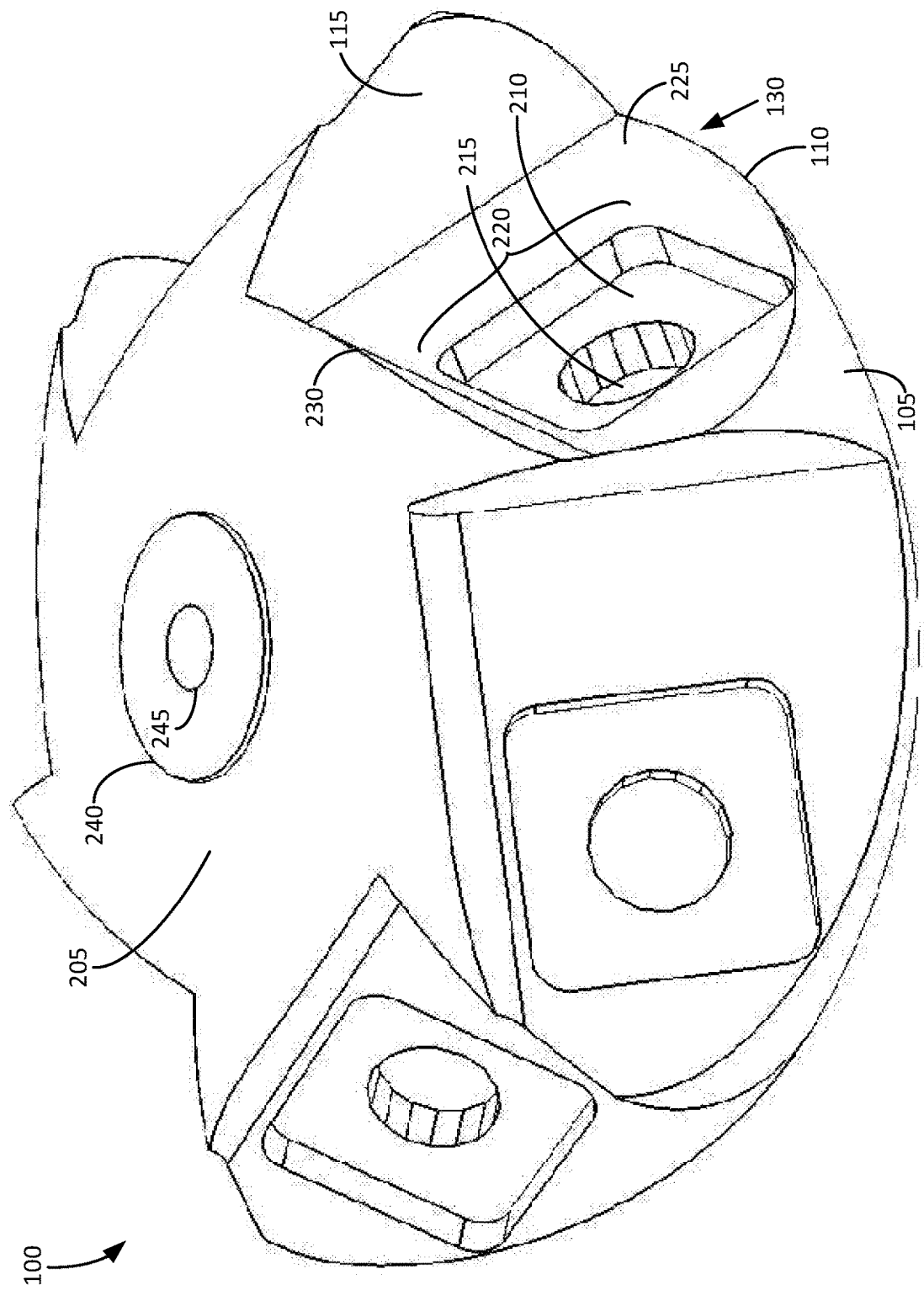
FIG. 4 illustrates a perspective view of the hemispherical base of FIG. 1 in accordance with various embodiments of the present inventive concept.

FIG. 2 illustrates a top view of the hemispherical base 100 of FIG. 1 in accordance with various embodiments of the present inventive concept. FIG. 3 illustrates a side elevation view of the hemispherical base 100 of FIG. 1. FIG. 4 illustrates a perspective view of the hemispherical base 100 of FIG. 1. Reference is now made to FIGS. 2 through 4.

Each of the receptacle notches 130 can include a primary contact surface 225 configured to make primary contact with a corresponding camera receptacle, as further described below. Each of the receptacle notches 130 can include an inner sidewall 230 extending from the radial sidewall 115. Each of the receptacle notches 130 can include an outer edge 110 defining an outer perimeter of the primary contact surface 225.

In some embodiments, each of the receptacle notches 130 can include a camera attachment section 220, which itself can include a first level attachment section 210 having a first depth and a second level attachment section 215 having a second depth. The first and second level attachment sections 210 and 215 can receive and secure a corresponding receptacle for holding a camera, as further described below. For example, at least a portion of the receptacle can be form-fit, screwed into, or otherwise fastened to the attachment section 220.

The hemispherical base 100 can included an outwardly facing surface 205. The outwardly facing surface 205 is a surface that is facing outwardly, that is, in a direction away from the multi-rotor aircraft. The hemispherical base 100 can include a utility attachment section 240, which can include a utility receptacle 245 such as a screw hole, cylindrical column, or the like. The utility attachment section 240 and utility receptacle 245 allows for the hemispherical base 100 to be flipped, or alternatively, for an additional vertical support beam to be attached thereto, with one or more additional hemispherical attachment assemblies mounted thereon, as further described below.

Figure 5:
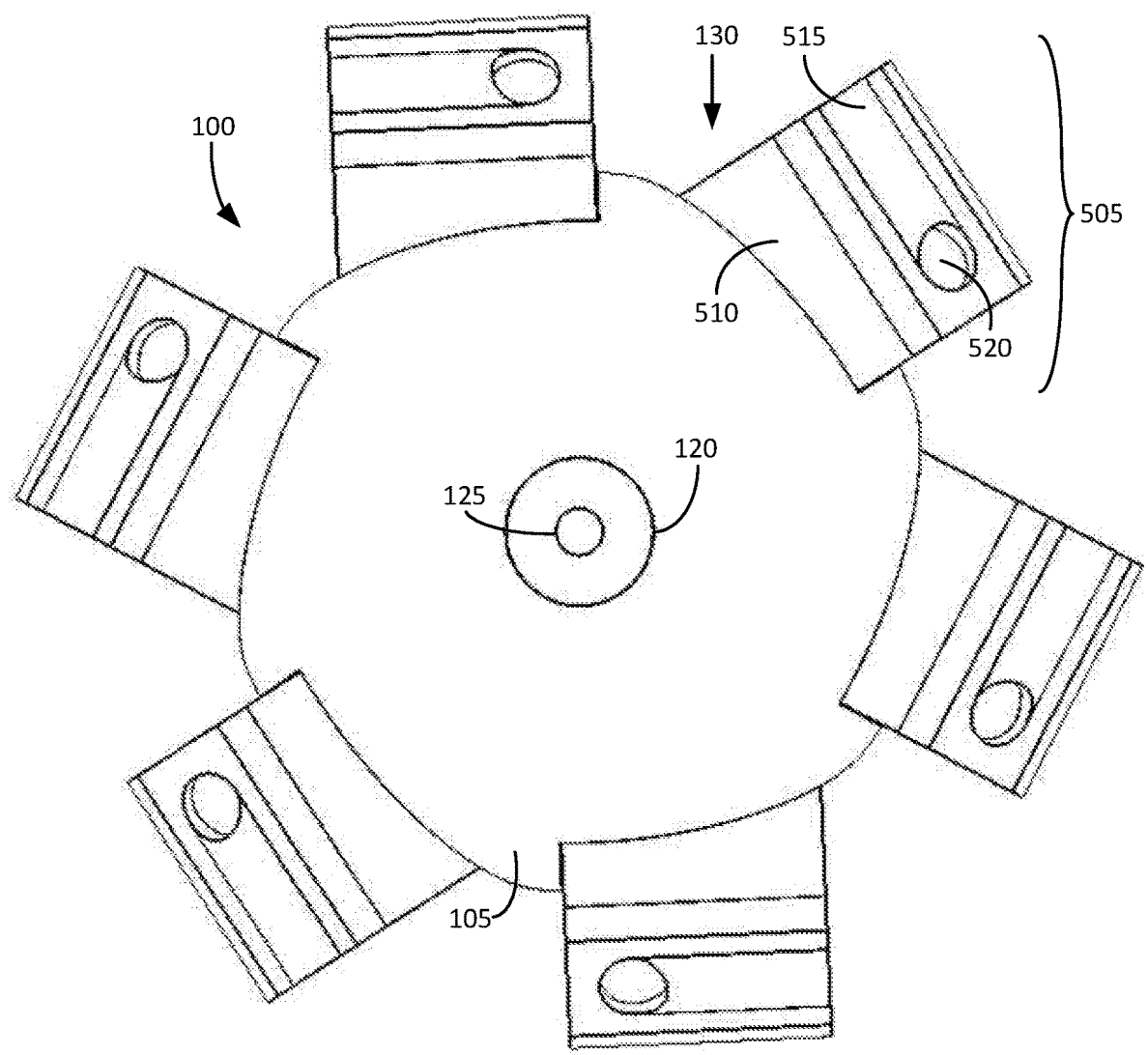
FIG. 5 illustrates a bottom view of an example hemispherical base of a split dual hemispherical attachment assembly of a multi-rotor aircraft, including camera receptacles attached thereto, in accordance with various embodiments of the present inventive concept.
Figure 6:
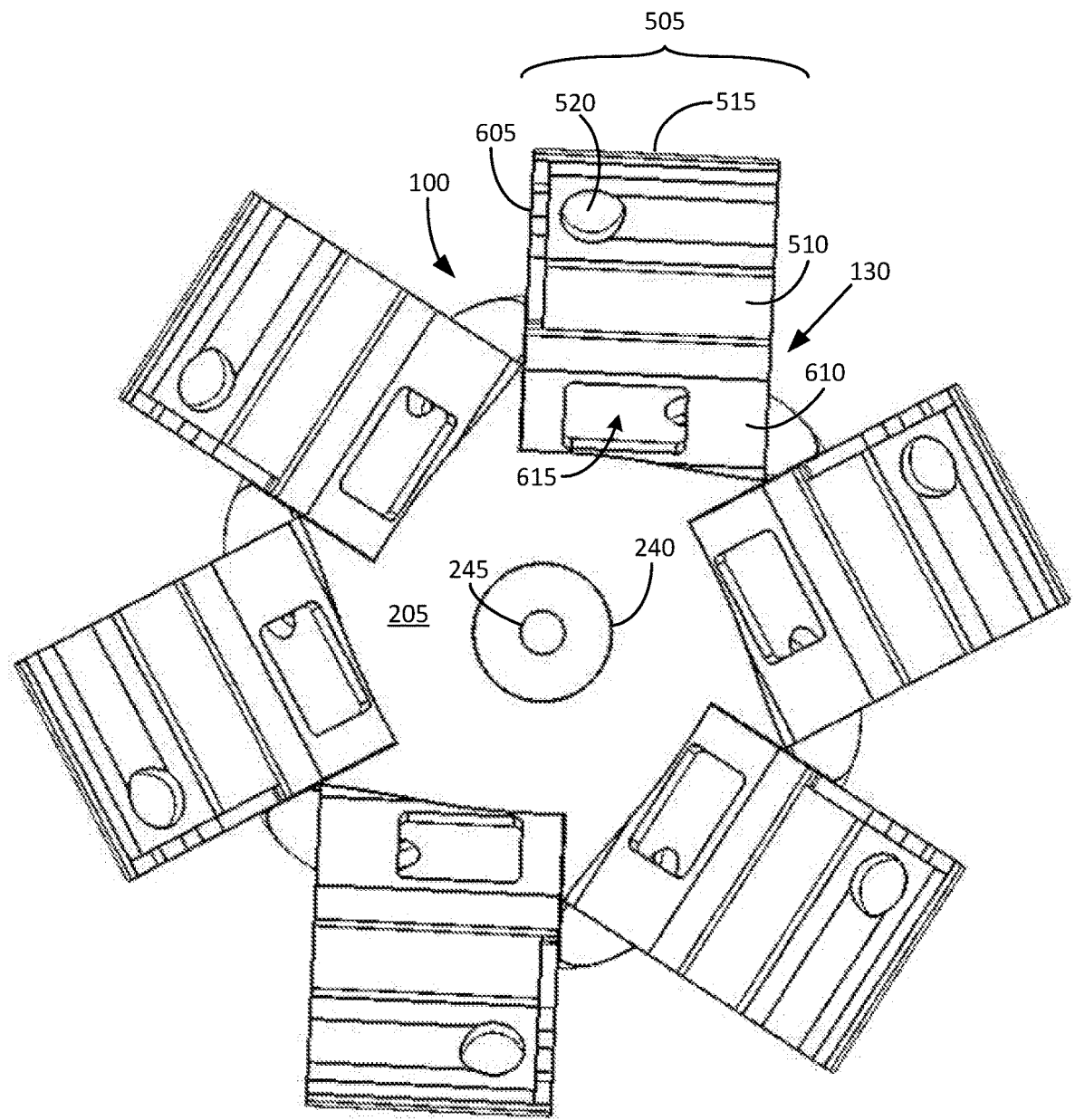
FIG. 6 illustrates a top view of the hemispherical base of FIG. 5, including the camera receptacles attached thereto, in accordance with various embodiments of the present inventive concept.
Figure 7:
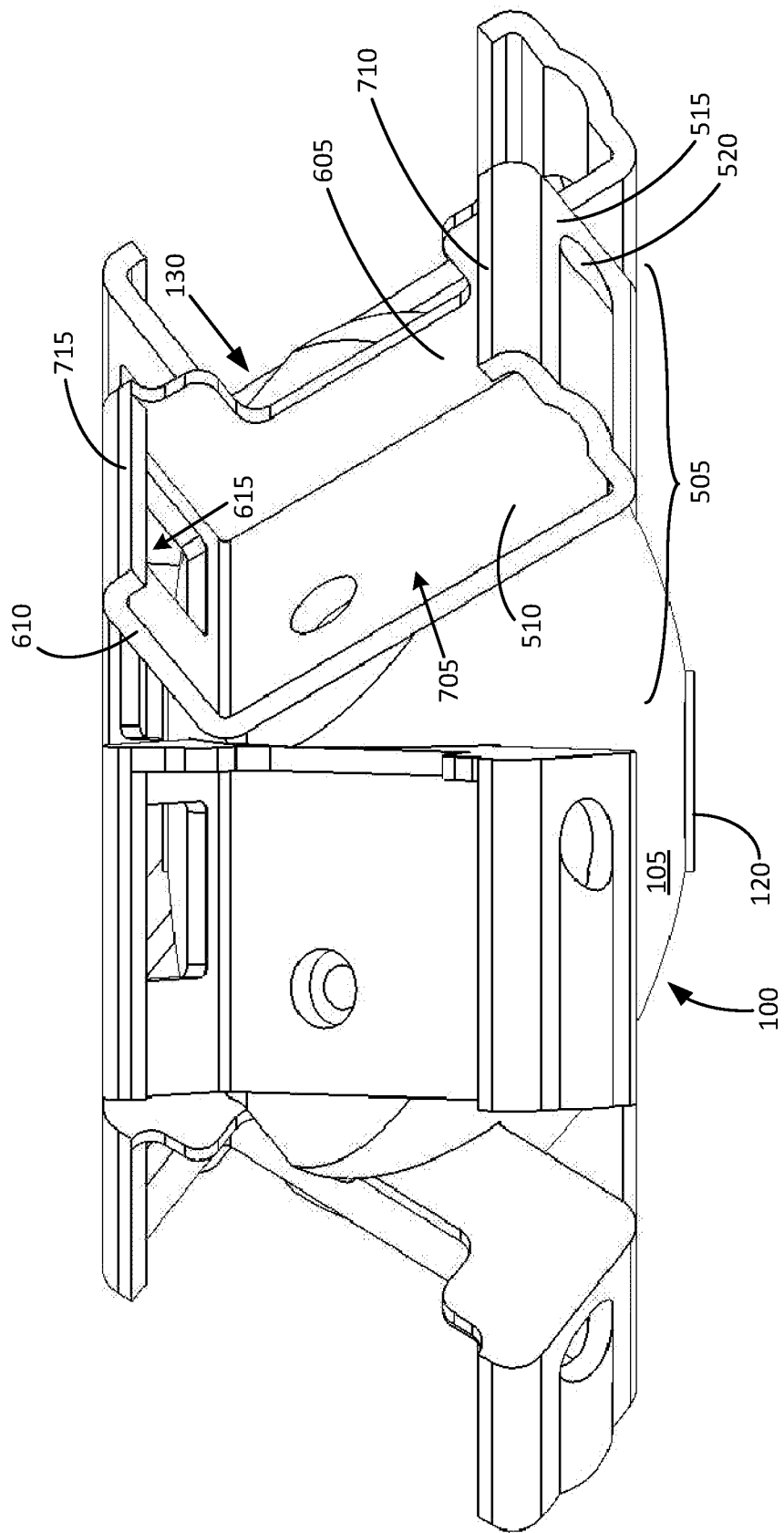
FIG. 7 illustrates a side elevation view of the hemispherical base of FIG. 5, including the camera receptacles attached thereto, in accordance with various embodiments of the present inventive concept.
Figure 8:
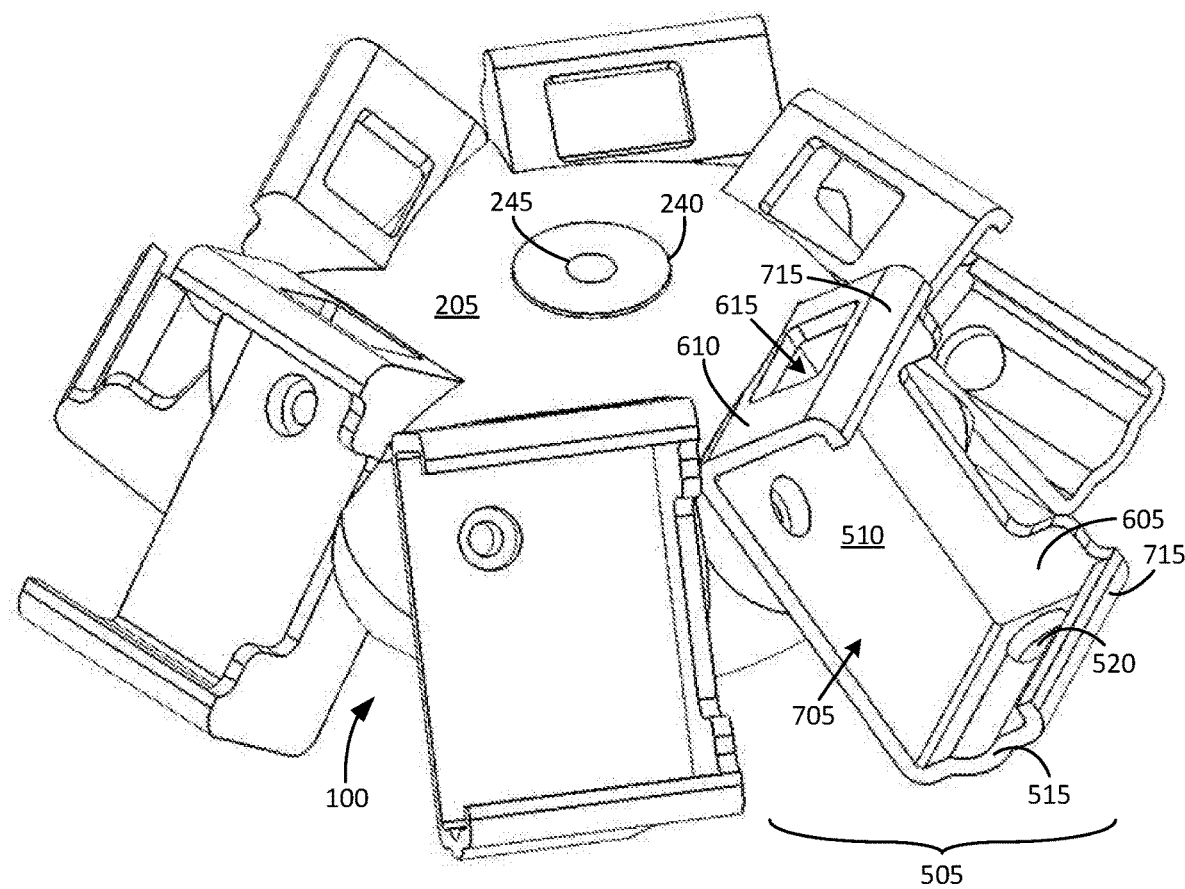
FIG. 8 illustrates a perspective view of the hemispherical base of FIG. 5, including the camera receptacles attached thereto, in accordance with various embodiments of the present inventive concept.

FIG. 5 illustrates a bottom view of an example hemispherical base 100 of a split dual hemispherical attachment assembly of a multi-rotor aircraft, including camera receptacles 505 attached thereto, in accordance with various embodiments of the present inventive concept. FIG. 6 illustrates a top view of the hemispherical base 100 of FIG. 5, including the camera receptacles 505 attached thereto. FIG. 7 illustrates a side elevation view of the hemispherical base 100 of FIG. 5, including the camera receptacles 505 attached thereto. FIG. 8 illustrates a perspective view of the hemispherical base 100 of FIG. 5, including the camera receptacles 505 attached thereto. Reference is now made to FIGS. 5 through 8.

In some embodiments, the camera receptacles 505 are separate from the hemispherical base, and attachable to a corresponding one of the receptacle notches 130 of the hemispherical base 100. In some embodiments, each of the camera receptacles 505 is coupled to a corresponding one of the receptacle notches 130. The receptacles 505 can be interchangeable for other receptacles. In other words, the receptacles 505 can be detached from the hemispherical base 100 and replaced with other kinds of receptacles 505 that are suitable for different kinds of cameras, sensors, and/or detectors. The receptacles 505 can be rotated or otherwise maneuvered to overlap aspect ratios at different locations and in various combinations.

Each of the camera receptacles 505 can receive and secure a corresponding camera (or other detector or sensor as the case may be), as further described below. The camera receptacles 505 can be seated in the receptacle notches 130 at particular angles that are configured to cause cameras attached to the camera receptacles to eliminate any parallax point and propellers of the multi-rotor aircraft from a 360 degree view, as further described below. The particular angles are possible due to the angles in which the receptacle notches 130 are built within the hemispherical base 100.

Each of the camera receptacles 505 can include an elongate primary wall 510, which makes primary contact with a corresponding receptacle notch 130. Each of the camera receptacles 505 can include a first sidewall 515. The first sidewall 515 can include a through hole 520. The first sidewall 515 can include a lip 710 for securing a camera on one side thereof. Each of the camera receptacles 505 can include a second sidewall 605 extending from the first sidewall 515. Each of the camera receptacles 505 can include a third sidewall 610 extending from the second sidewall 605. The third sidewall 610 can include a rectangular opening 615. It will be understood that the rectangular opening 615 can take the form of another shape such as a circle, triangle, or the like. The third sidewall 610 can include a lip 715 for securing the camera on another side thereof. Each of the camera receptacles 505 can include an open side 705 through which a corresponding camera can be received and secured within the camera receptacle 505.

Figure 9:
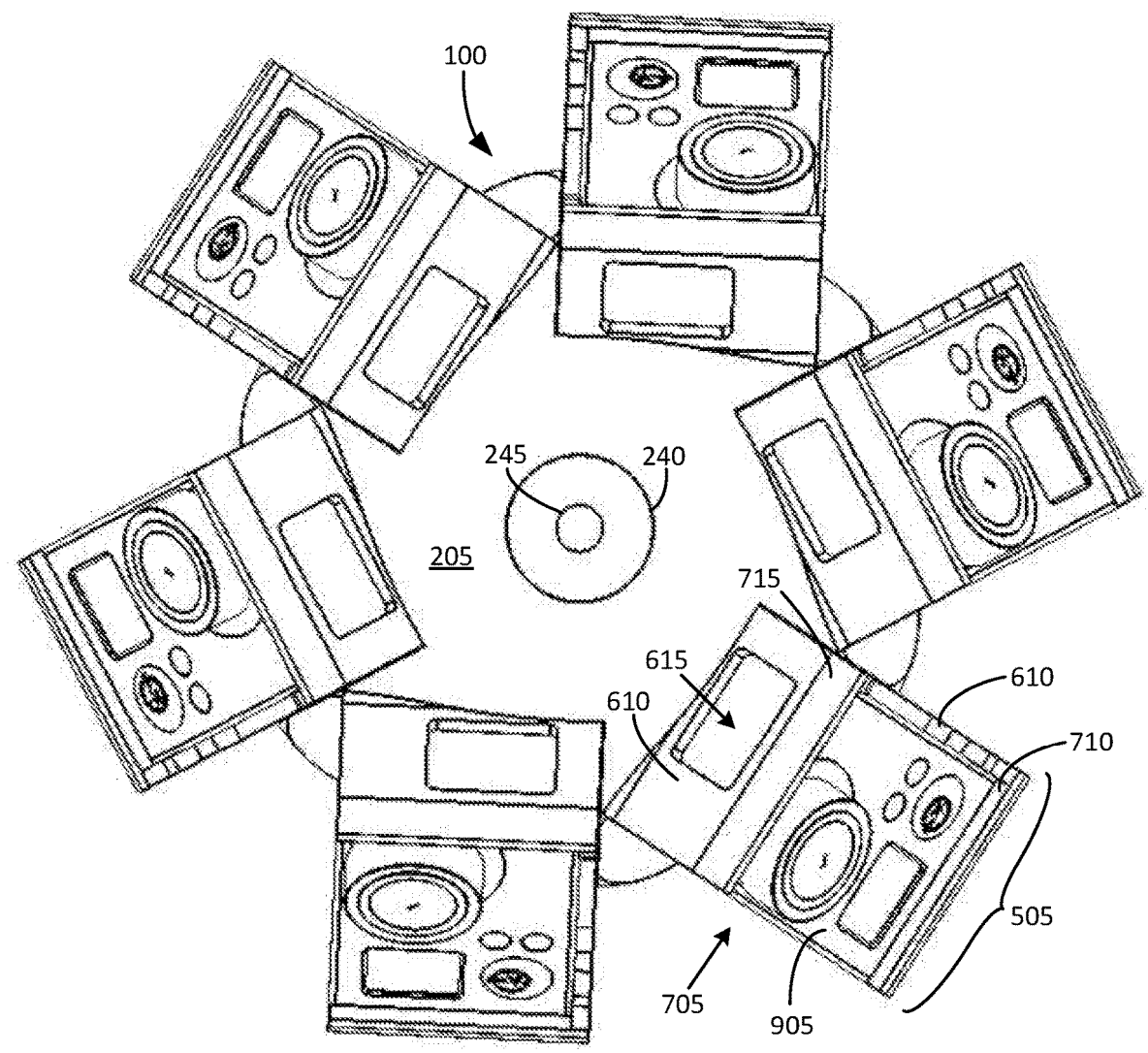
FIG. 9 illustrates a top view of an example hemispherical base of a split dual hemispherical attachment assembly of a multi-rotor aircraft, including camera receptacles attached thereto, and cameras disposed in the camera receptacles, in accordance with various embodiments of the present inventive concept.
Figure 10:
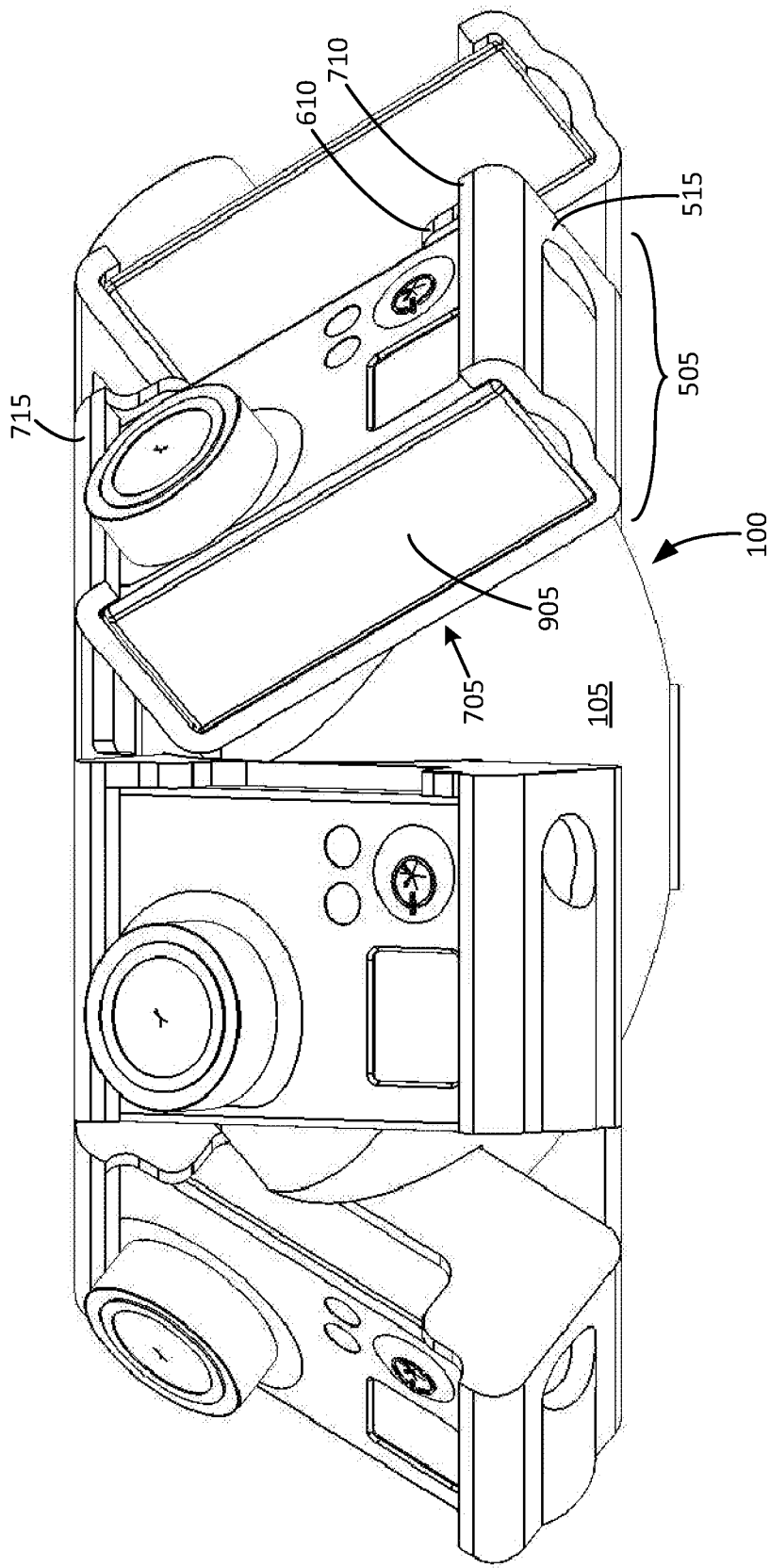
FIG. 10 illustrates a side elevation view of the hemispherical base of FIG. 9, including the camera receptacles attached thereto, and the cameras disposed in the camera receptacles, in accordance with various embodiments of the present inventive concept.
Figure 11:
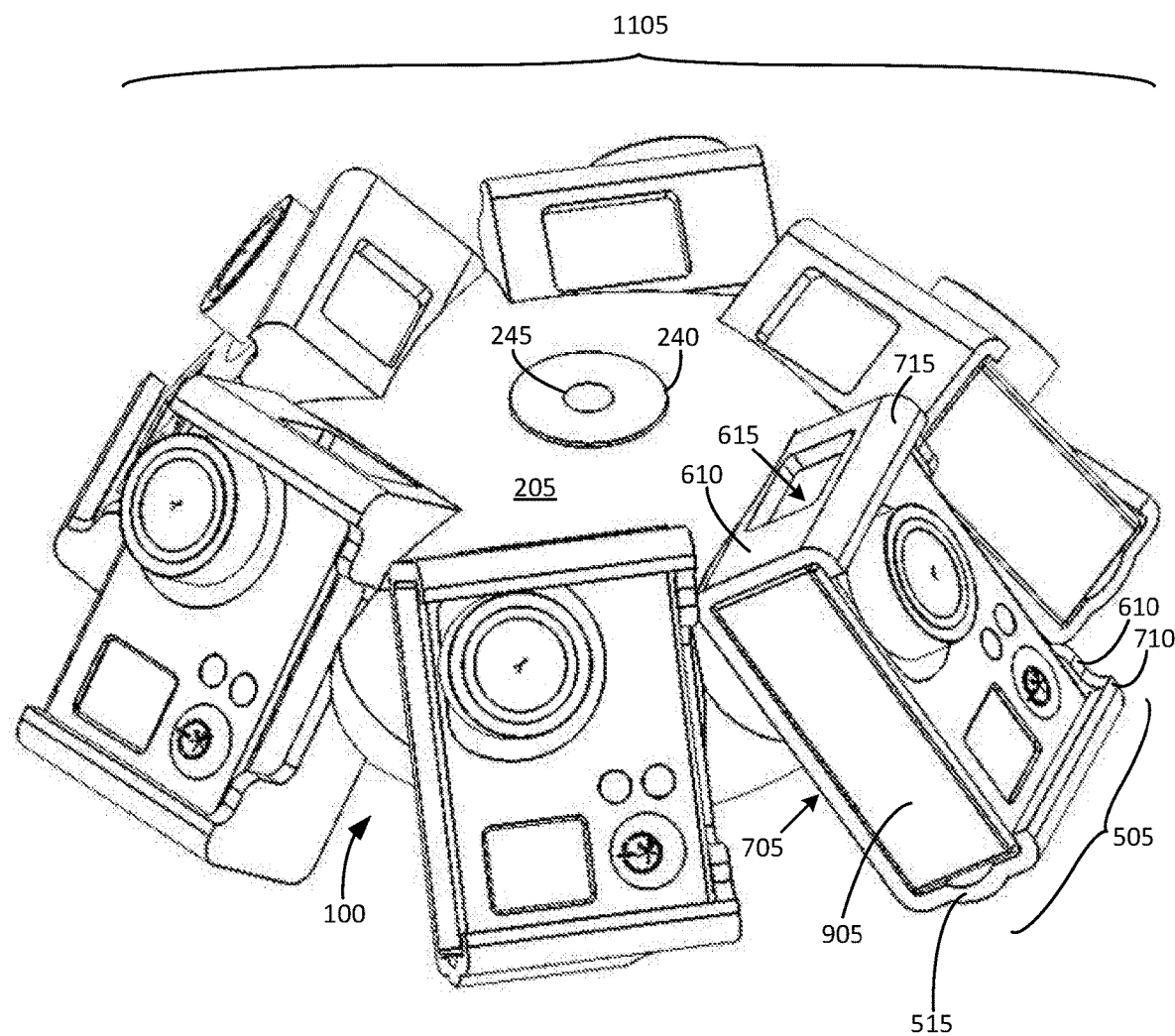
FIG. 11 illustrates a perspective view of a hemispherical assembly including the hemispherical base of FIG. 9, and further including the camera receptacles attached thereto, and the cameras disposed in the camera receptacles, in accordance with various embodiments of the present inventive concept.

FIG. 9 illustrates a top view of an example hemispherical base 100 of a split dual hemispherical attachment assembly of a multi-rotor aircraft, including camera receptacles 505 attached thereto, and cameras 905 disposed in the camera receptacles 505, in accordance with various embodiments of the present inventive concept. FIG. 10 illustrates a side elevation view of the hemispherical base of FIG. 9, including the camera receptacles 505 attached thereto, and the cameras 905 disposed therein. FIG. 11 illustrates a perspective view of a hemispherical assembly 1105 including the hemispherical base 100 of FIG. 9, and further including the camera receptacles 505 attached thereto, and the cameras 905 disposed therein. Reference is now made to FIGS. 9 through 11.

Each of the camera receptacles 505 can receive and secure a corresponding camera 905. The camera receptacles 505 can be seated in the receptacle notches 130 at particular angles that are configured to cause the cameras 905 attached to the camera receptacles 505 to eliminate any parallax point and propellers of the multi-rotor aircraft from a 360 degree view. The particular angles are possible due to the angles in which the receptacle notches 130 are built within the hemispherical base 100, which secure the camera receptacles 505, which in turn secure the corresponding cameras 905 in their proper alignment.

Each of the camera receptacles 505 can include an elongate primary wall 510, which makes primary contact with a corresponding receptacle notch 130, as described in detail above. The first sidewall 515 can include a lip 710 for securing a camera 905 on one side thereof. Each of the camera receptacles 505 can include a second sidewall 605 extending from the first sidewall 515. Each of the camera receptacles 505 can include a third sidewall 610, which secures the camera 905 within the camera receptacle 505. The third sidewall 610 can include a rectangular opening 615, exposing a side portion of the camera 905. The third sidewall 610 can include a lip 715 for securing the camera 905 on another side thereof. Each of the camera receptacles 505 can include an open side 705 through which a corresponding camera can be received and secured within the camera receptacle 505.

Figure 12:
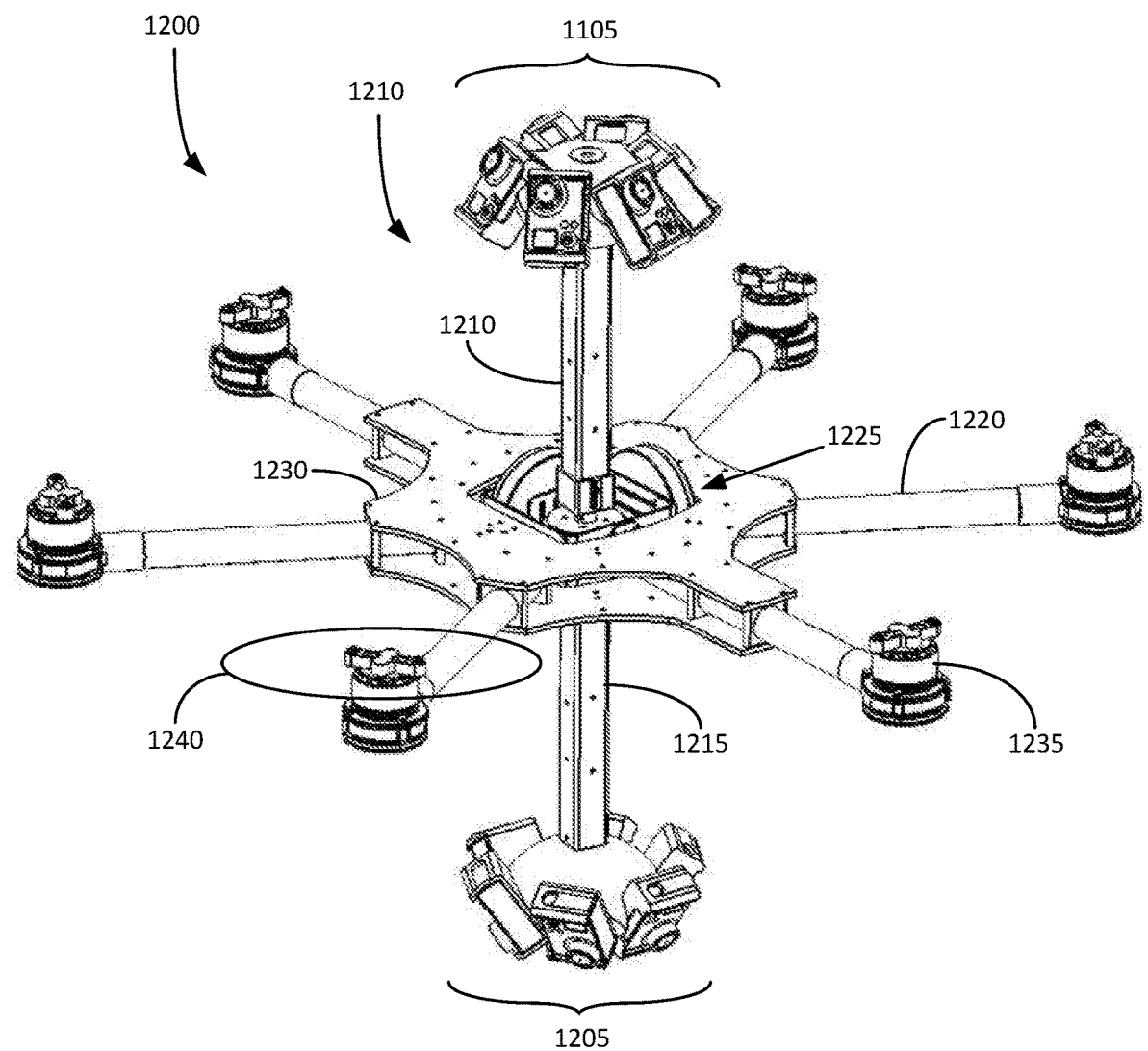
FIG. 12 illustrates a perspective view of an example multi-rotor aircraft in accordance with various embodiments of the present inventive concept.
Figure 13:
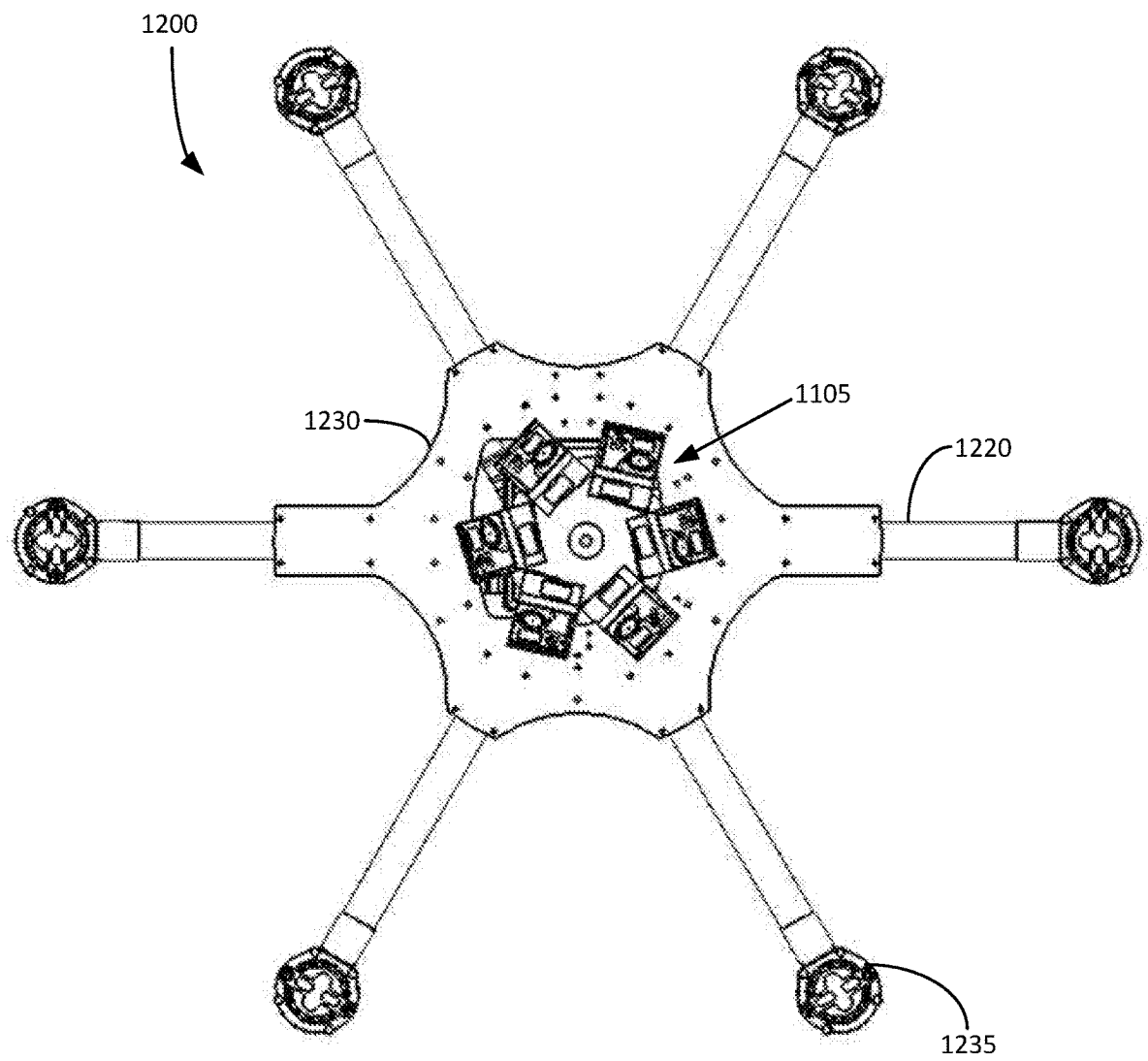
FIG. 13 illustrates a top view of the multi-rotor aircraft of FIG. 12, in accordance with various embodiments of the present inventive concept.
Figure 14:
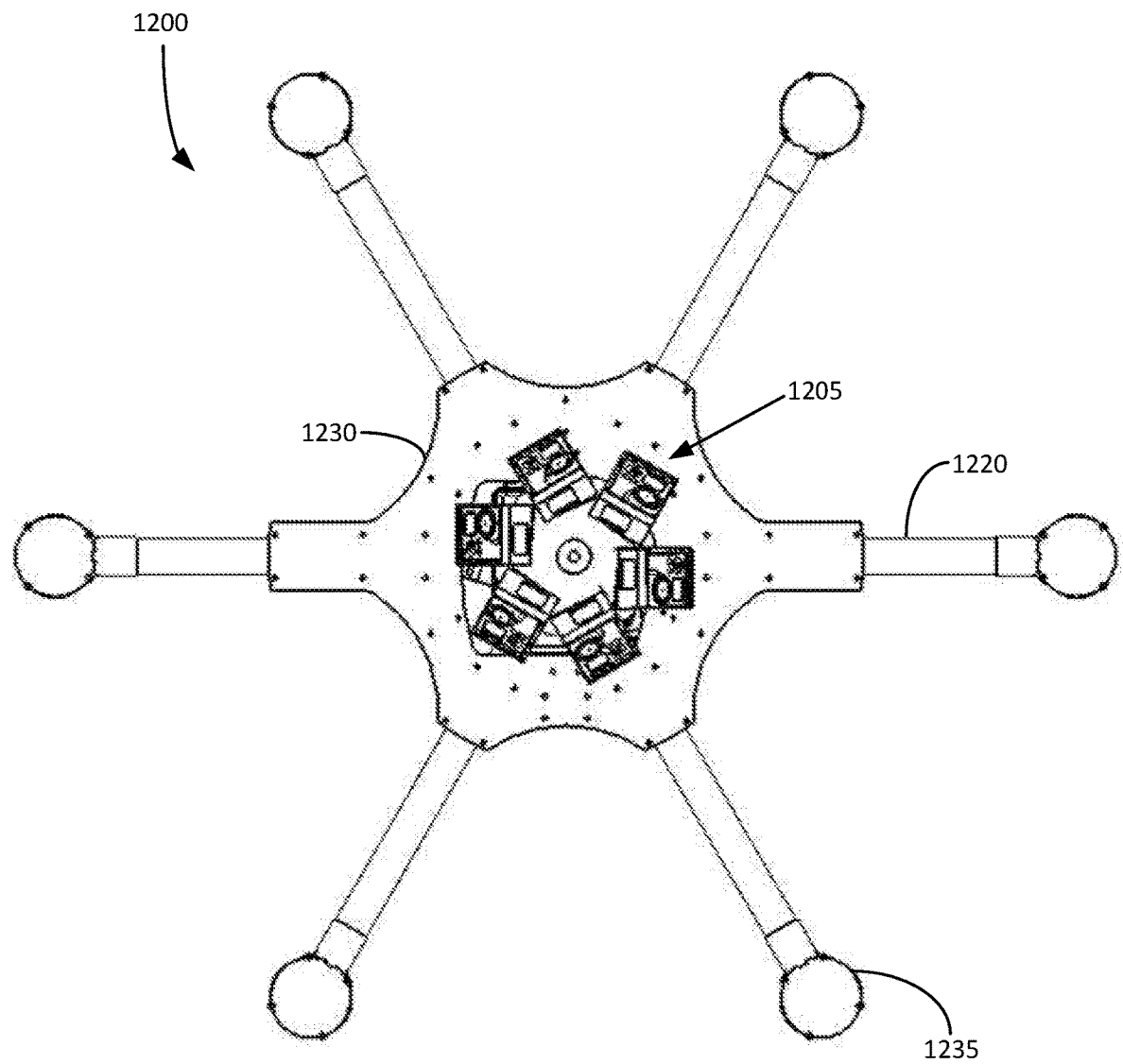
FIG. 14 illustrates a bottom view of the multi-rotor aircraft of FIG. 12, in accordance with various embodiments of the present inventive concept.
Figure 15:
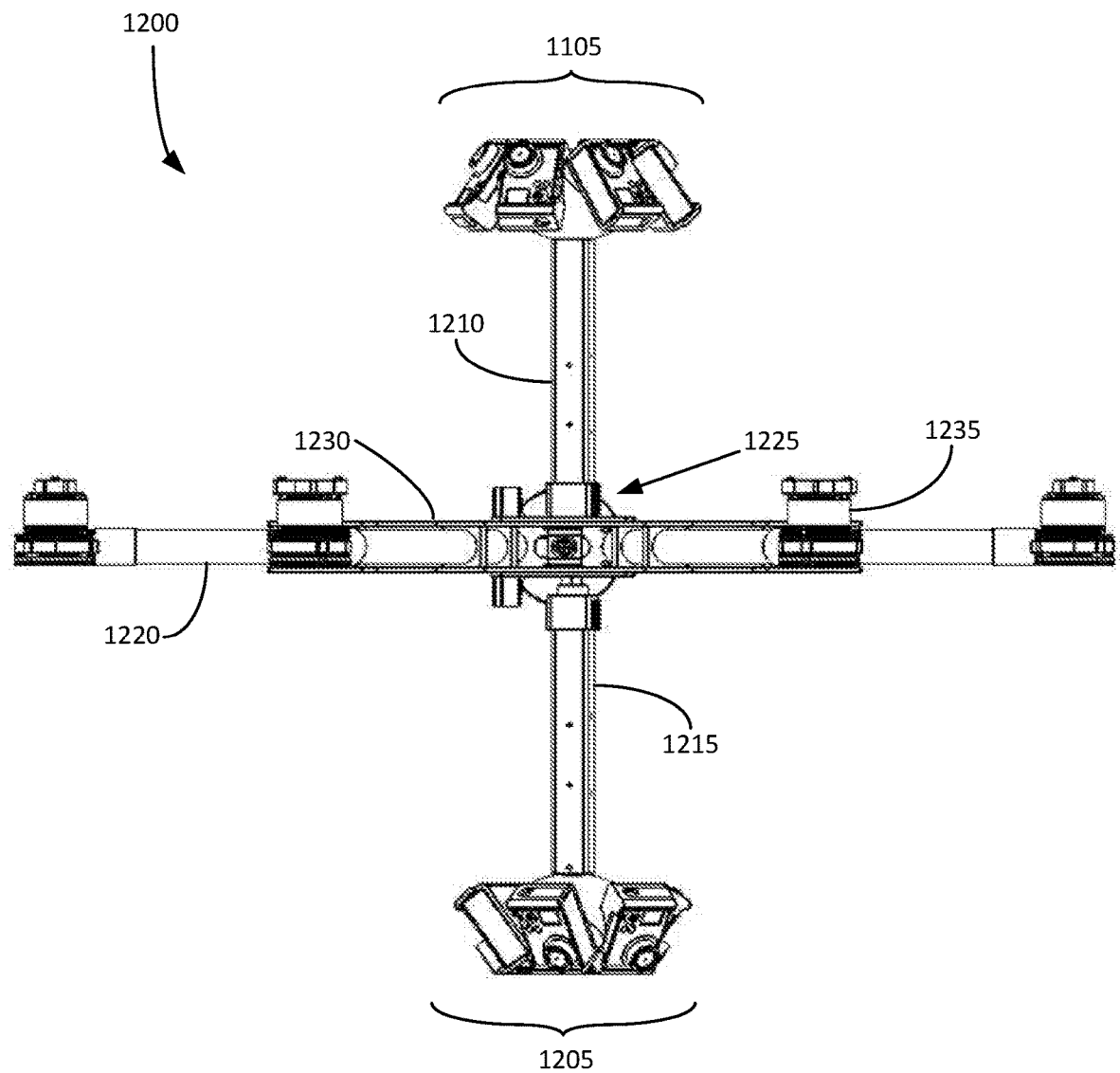
FIG. 15 illustrates a side elevation view of the multi-rotor aircraft of FIG. 12, in accordance with various embodiments of the present inventive concept.

FIG. 12 illustrates a perspective view of an example multi-rotor aircraft 1200 in accordance with various embodiments of the present inventive concept. FIG. 13 illustrates a top view of the multi-rotor aircraft 1200 of FIG. 12. FIG. 14 illustrates a bottom view of the multi-rotor aircraft 1200 of FIG. 12. FIG. 15 illustrates a side elevation view of the multi-rotor aircraft 1200 of FIG. 12. Reference is now made to FIGS. 12 through 15.

The multi-rotor aircraft 1200 can include a split dual hemispherical attachment apparatus 1210. The split dual hemispherical attachment apparatus 1210 can include an upper hemispherical assembly 1105, a lower hemispherical assembly 1205, an upper vertical support beam 1210, and a lower vertical support beam 1215. The upper vertical support beam 1210 can be coupled to a gimbal 1225. In addition, the lower vertical support beam 1215 can be coupled to the gimbal 1225. The upper hemispherical attachment assembly 1105 can be coupled to the upper vertical support beam 1210. The lower hemispherical attachment assembly 1205 can be coupled to the lower vertical support beam 1215.

The multi-rotor aircraft 1200 can include a base platform 1230. Moreover, the multi-rotor aircraft 1200 can include arms 1220 extending radially from the base platform 1230. The multi-rotor aircraft 1200 can include propeller motors 1235 each coupled to a corresponding one of the arms 1220. The multi-rotor aircraft 1200 can include propellers (e.g., 1240) each coupled to a corresponding one of the propeller motors 1235. The gimbal 1225 can be coupled to the base platform 1230.

The gimbal 1225 can maintain the upper vertical support beam 1210 and the lower vertical support beam 1215 in a vertical orientation relative to a ground surface during flight of the multi-rotor aircraft 1200. The gimbal 1225 can stabilize the vertical support beams 1210 and 1215 in substantially a perpendicular orientation relative to the surface of the earth even though the base platform 1230 and arms 1220 may tilt, pitch, roll, or yaw with the forces that are exerted by the multi-rotor aircraft 1200.

The multi-rotor aircraft 1200 is sometimes referred to as a "drone" or "copter." The multi-rotor aircraft 1200 can include multiple propellers 1240. Each propeller 1240 can be coupled to a corresponding motor 1235, which can be coupled to a corresponding arm (e.g., 1220). It will be understood that a two-blade propeller configuration, a three-blade propeller configuration, a four-blade propeller configuration, etc., and indeed, any suitable number of blade configurations can be used without departing from the inventive concept disclosed herein. Each of the corresponding arms 1220 can be coupled to the multi-rotor aircraft base platform 1230.

The split dual hemispherical attachment apparatus 1210 can be coupled to the multi-rotor aircraft base platform 1230 via the gimbal 1225. For example, the base platform 1230 can be coupled to the gimbal 1225, which can be coupled to the vertical support beams (e.g., 1210 and 1215) of the split dual hemispherical attachment apparatus 1210. The gimbal 1225 can keep the vertical support beams (e.g., 1210 and 1215) substantially perpendicular with respect to the ground of the earth, so that content can be captured without significant vibration and variation due to movements of the multi-rotor aircraft 1200.

In other words, even when the multi-rotor aircraft 1200 tilts, pans, yaws, and/or otherwise flies around, the gimbal 1225 can keep the split dual hemispherical attachment apparatus 1210 in a substantially same orientation relative to the earth. The base platform 1230 can be a stabilization platform, which can function in tandem with the gimbal 1225 to stabilize the split dual hemispherical attachment apparatus 1210 relative to the earth during flights or movement. Alternatively, the base platform 1230 can be directly attached to the vertical support beams (e.g., 1210 and 1215) without the use of the gimbal 1225. The gimbal 1225 can be constructed to accommodate two or three axes of aircraft movement. Having a third axis allows for the stabilization of pan and/or yaw. For example, to accommodate a third axis, the gimbal 1225 can be slightly larger, the multi-rotor aircraft 1200 can have slightly smaller propellers 1240, and/or the multi-rotor aircraft 1200 can have fewer propeller stations. For example, the multi-rotor aircraft 1200 can include only four stations and associated motors rather than six stations and associated motors. In such an embodiment, in a dual-propeller configuration, the multi-rotor aircraft 1200 can include four pairs of propellers 1240, for a total of eight propellers 1240 instead of twelve. Moreover, the motors 1235 for the propellers 2410 can spin relatively faster to maintain lifting capacity and maneuverability with smaller propellers. Accordingly, approximately 30 degrees of pan stability or more can be achieved.

The positioning of the receptacles 505 permit the capturing of seamless content without any view of the propellers 1240 in the content. The cameras, sensors, or other detectors can fit in the receptacles 505 and also do not interfere with the airflow of the propellers 1240. For example, the cameras 905 can fit within corresponding receptacles 505.

The multi-rotor aircraft 1200 can include landing gear (not shown), which can be attached beneath the aircraft for support while it sits on a table or the ground when the attachment apparatus 1210 is mounted to the multi-rotor aircraft 1200.

Figure 16:
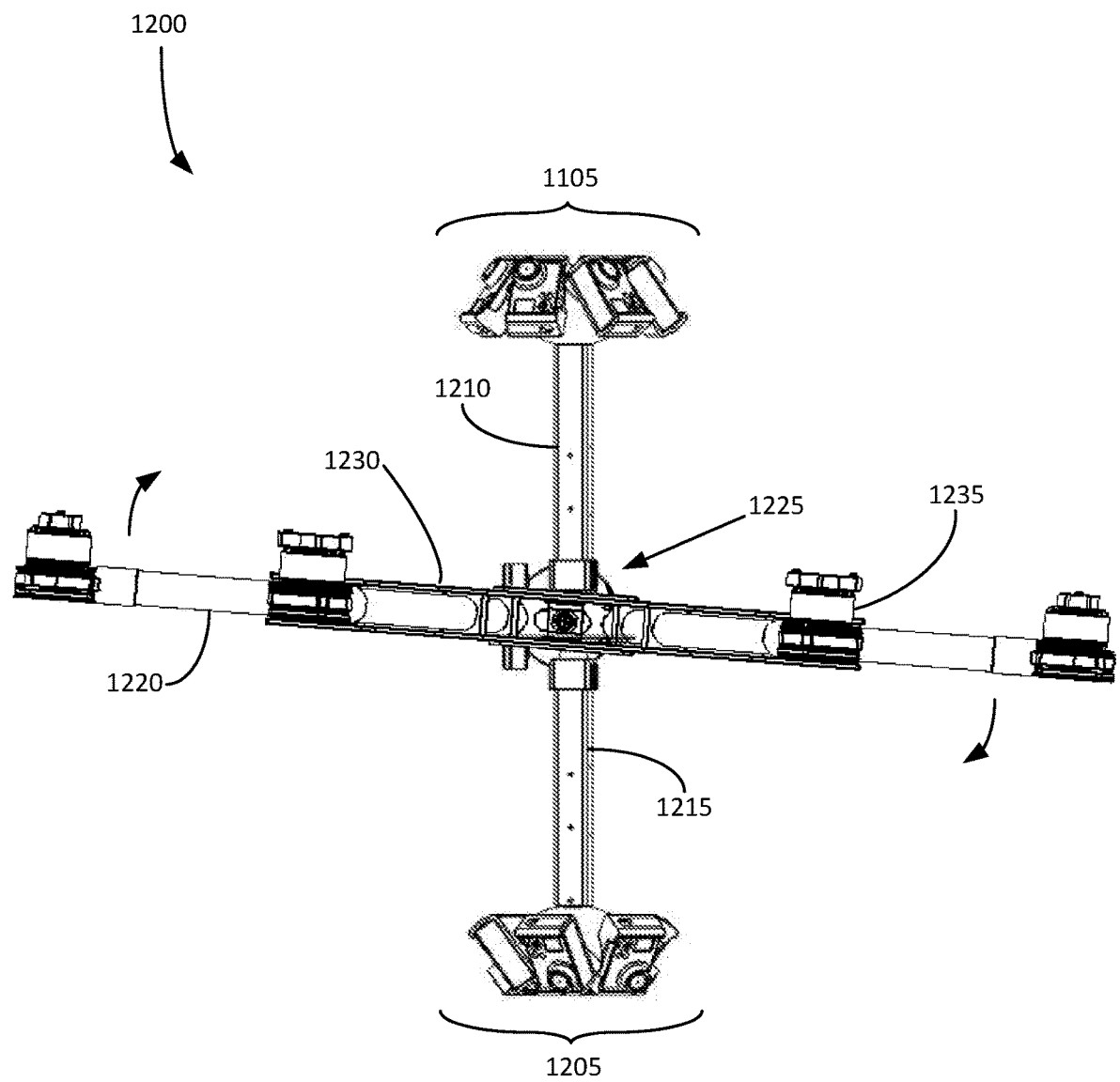
FIG. 16 illustrates another side elevation view of the multi-rotor aircraft of FIG. 12, in accordance with various embodiments of the present inventive concept.

FIG. 16 illustrates another side elevation view of the multi-rotor aircraft 1200 of FIG. 12, in accordance with various embodiments of the present inventive concept. Referring to FIG. 12, the base platform 1230 and arms 1220 can tilt due to the force of the propellers 1240, the direction of travel of the multi-rotor aircraft 1200, the wind conditions, or the like. The gimbal 1225 can stabilize the vertical support beams 1210 and 1215 in substantially a vertical, perpendicular orientation relative to the surface of the earth even though the base platform 1230 and arms 1220 may tilt, pitch, roll, or yaw with the forces that are exerted by the multi-rotor aircraft 1200, and by external forces. In this manner, not only can seamless video content be gathered, but in addition, the media content gathered can be stable and free from jerkiness that would otherwise be present. As a result, the media content that is gathered can provide a more pleasing virtual reality experience.

Figure 17:
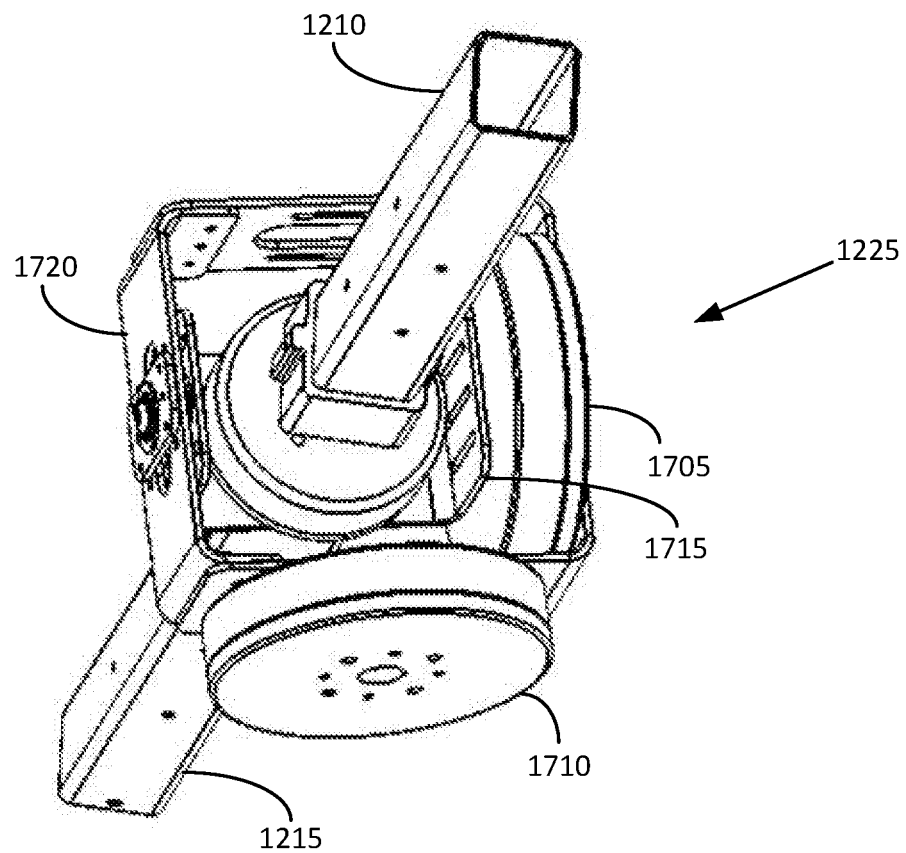
FIG. 17 illustrates a perspective view of a gimbal used with the multi-rotor aircraft of FIG. 12 in accordance with various embodiments of the present inventive concept.

FIG. 17 illustrates a perspective view of an example gimbal 1225 used with the multi-rotor aircraft 1200 of FIG. 12 in accordance with various embodiments of the present inventive concept. The gimbal 1225 can include a first gimbal motor 1705, which can to tilt the vertical support beams (e.g., 1210 and 1215) in a first direction. The gimbal 1225 can include a second gimbal motor 1710, which can tilt the vertical support beams (e.g., 1210 and 1215) in a second direction. More specifically, the gimbal 1225 can include a bracket 1715 coupled to the first gimbal motor 1705, and a bracket 1720 coupled to the second gimbal motor 1710.

The upper vertical support beam 1210 can be coupled to the bracket 1210 of the gimbal 1225, and the lower vertical support beam 1215 can also be coupled to the bracket 1715 of the gimbal 1225. The first gimbal motor 1705 can rotate the bracket 1715 and tilt the first vertical support beam 1210 and the second vertical support beam 1215 in a first or second direction. The second gimbal motor 1710 can rotate the bracket 1720 and tilt the first vertical support beam 1210 and the second vertical support beam 1215 in a third or fourth direction. In this manner, the gimbal 1225 can stabilize the vertical support beams on three axes and maintain their vertical orientation relative to the ground surface during flight.

Figure 18:
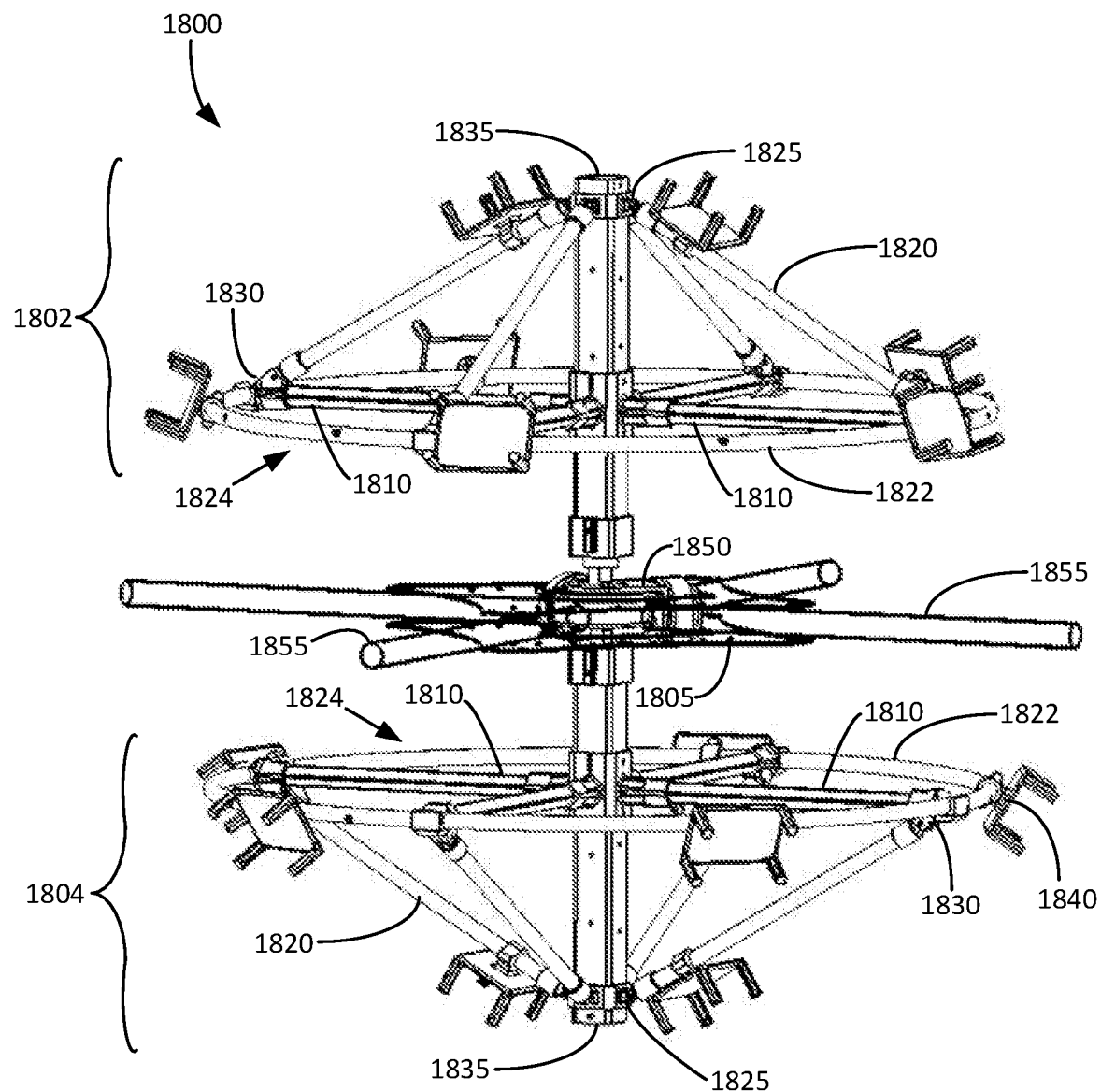
FIG. 18 illustrates a first perspective view of an example split dual hemispherical attachment apparatus for a multi-rotor aircraft in accordance with various embodiments of the present inventive concept.
Figure 19:
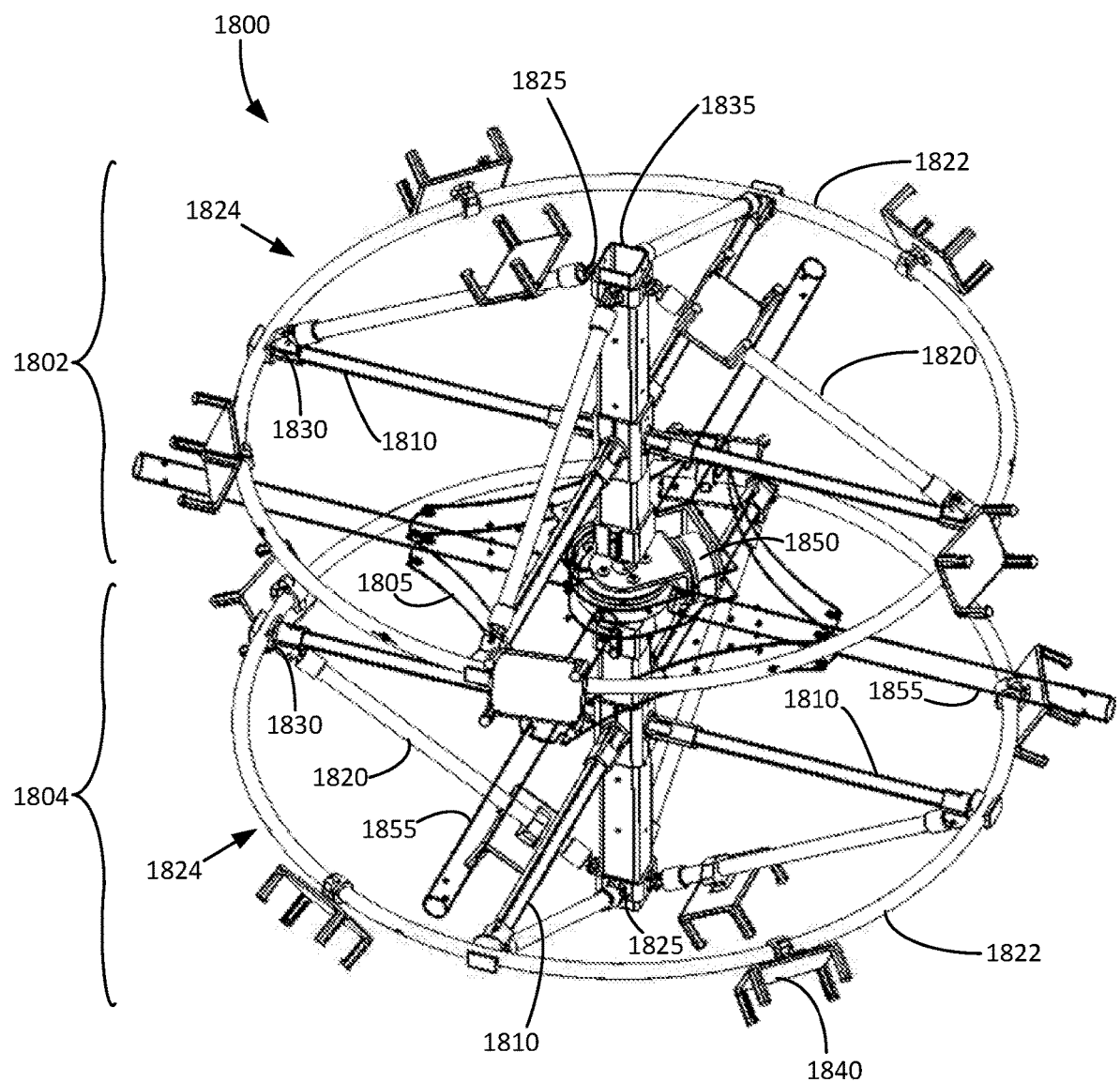
FIG. 19 illustrates a second perspective view of the split dual hemispherical attachment apparatus of FIG. 18 in accordance with various embodiments of the present inventive concept.
Figure 20:
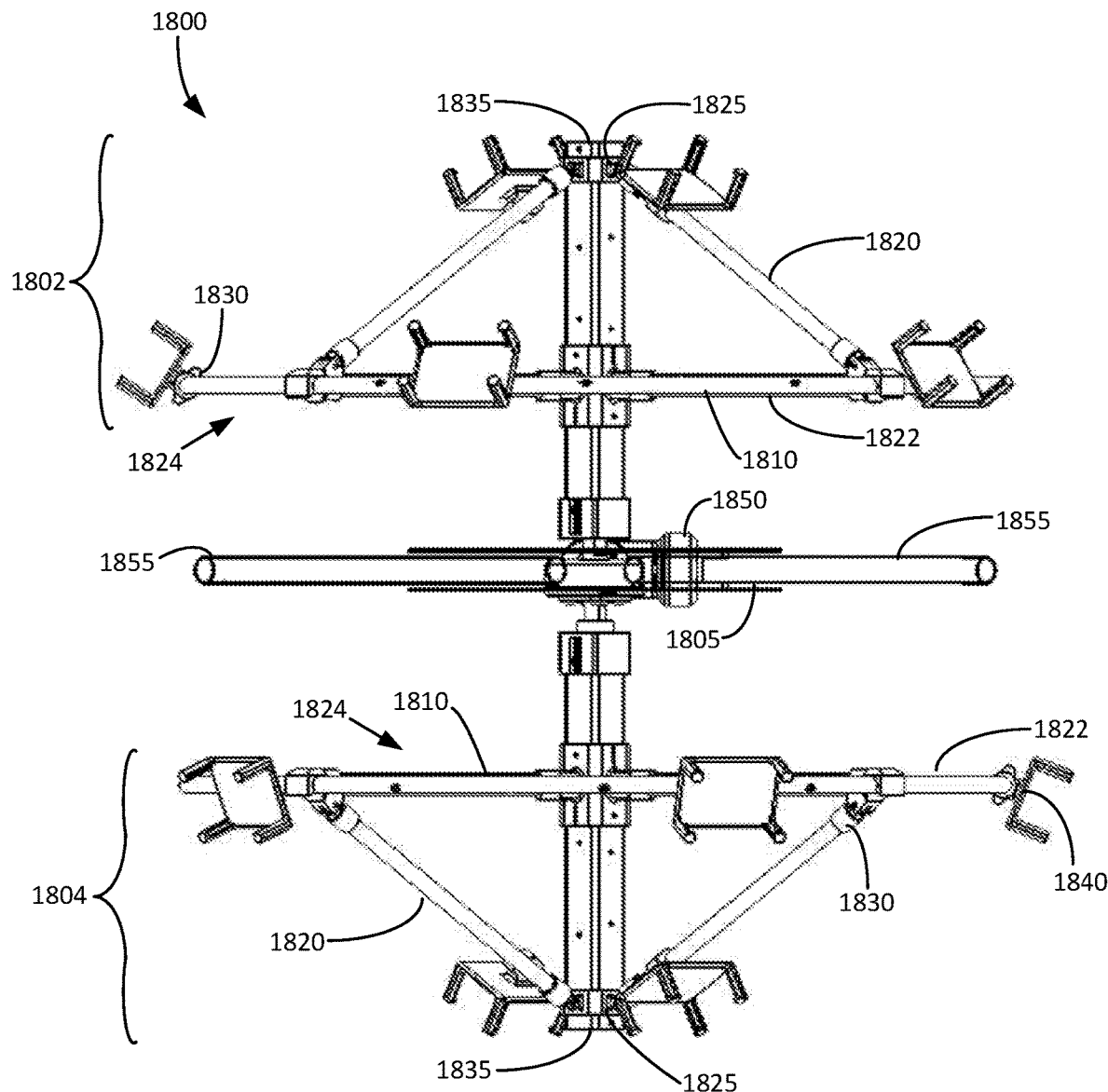
FIG. 20 illustrates a first side elevation view of the split dual hemispherical attachment apparatus of FIG. 18 in accordance with various embodiments of the present inventive concept.
Figure 21:
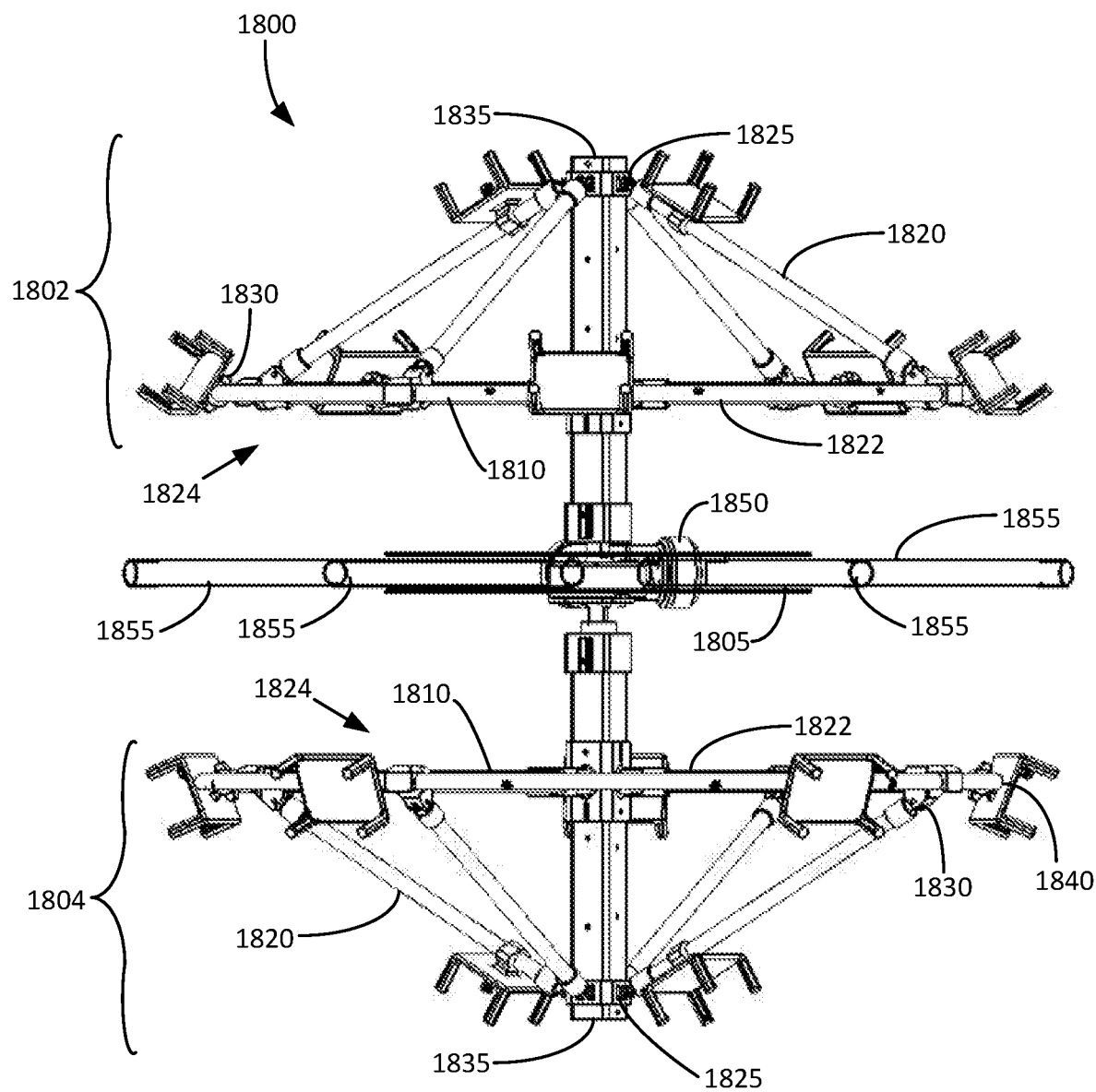
FIG. 21 illustrates a second side elevation view of the split dual hemispherical attachment apparatus of FIG. 18 in accordance with various embodiments of the present inventive concept.
Figure 22A:
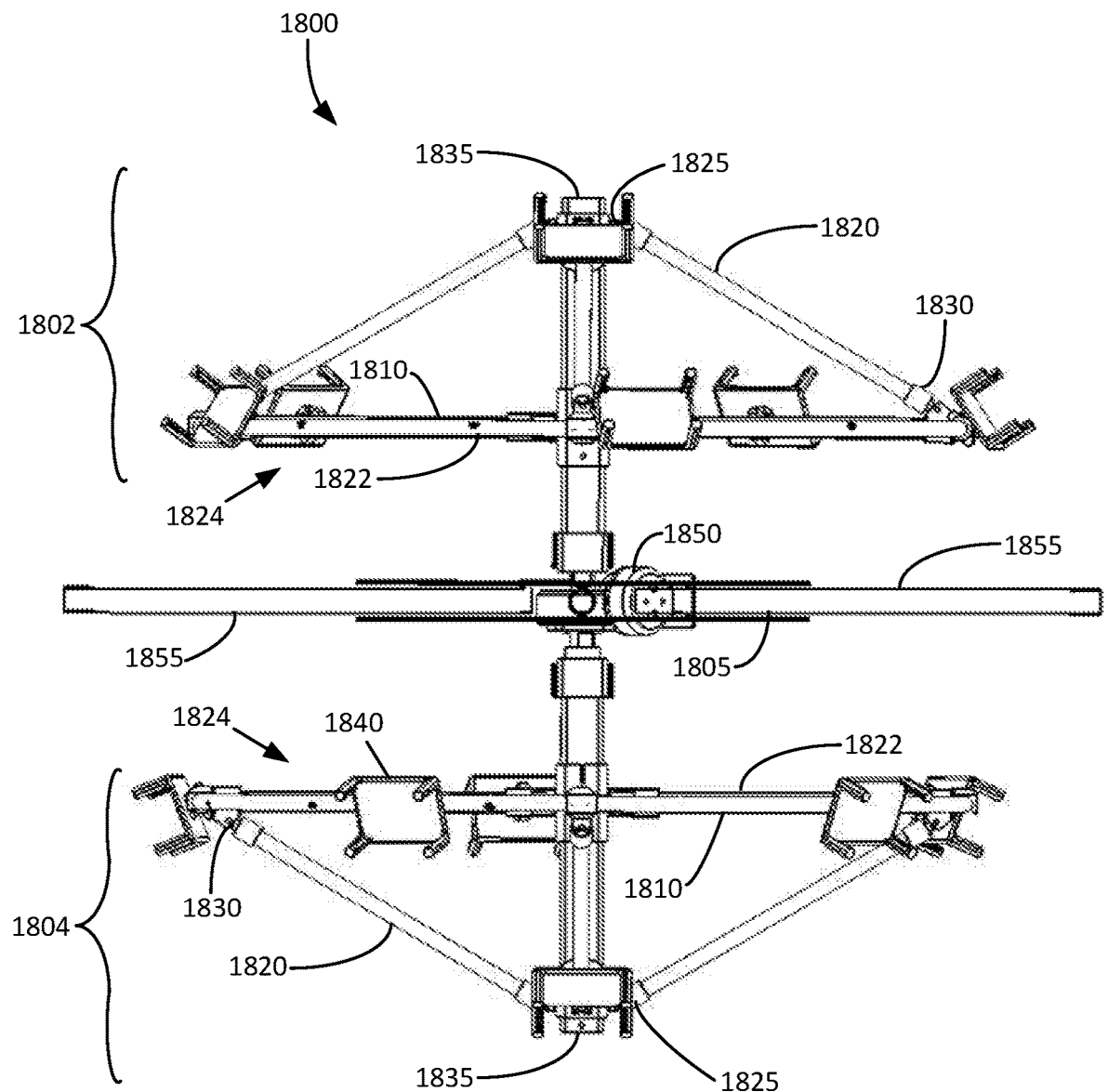
FIG. 22A illustrates a third side elevation view of the split dual hemispherical attachment apparatus of FIG. 18 in accordance with various embodiments of the present inventive concept.
Figure 22B:
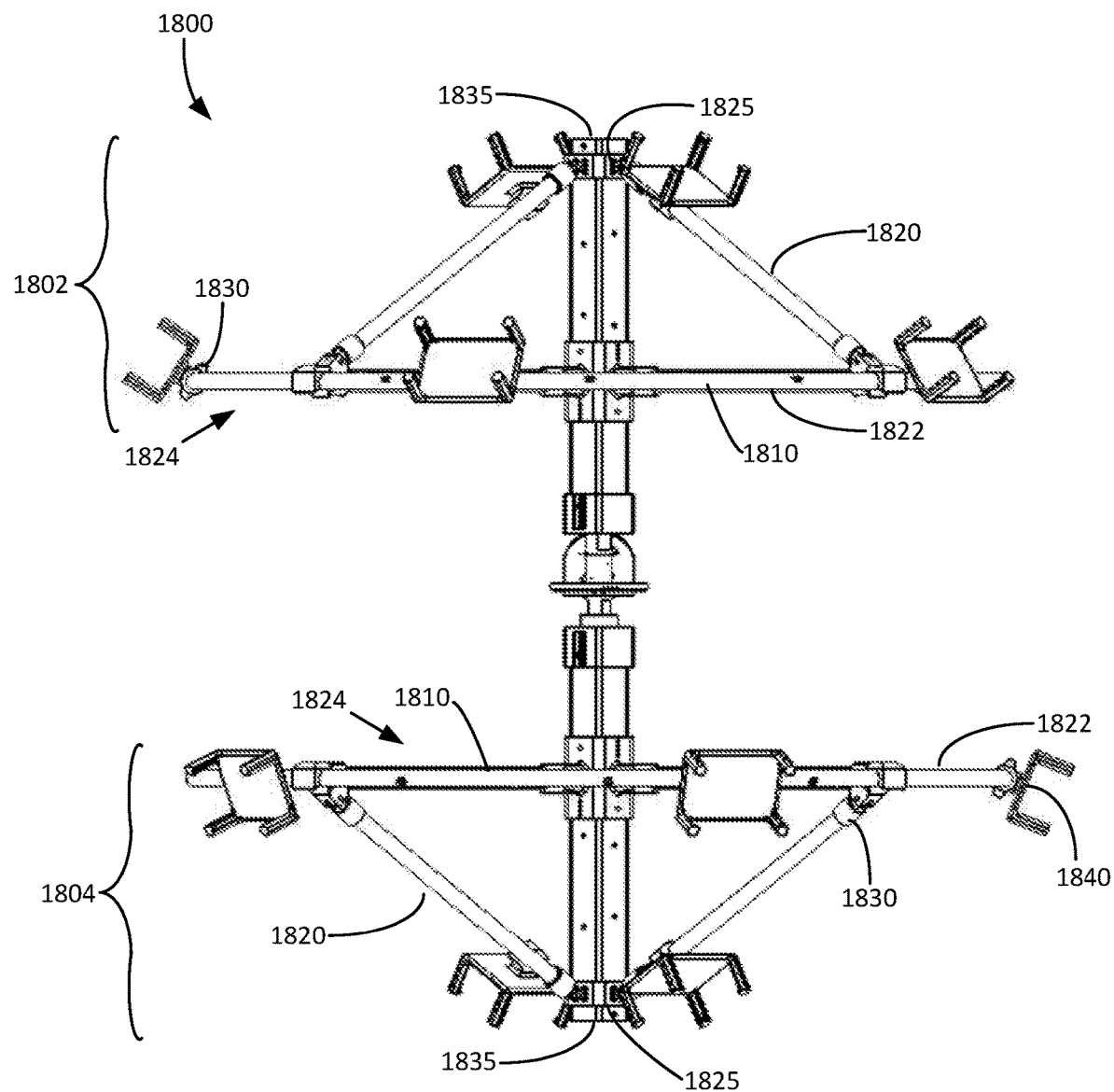
FIG. 22B illustrates a fourth side elevation view of the split dual hemispherical attachment apparatus of FIG. 18 without the gimbal, arms, and base platform in accordance with various embodiments of the present inventive concept.
Figure 23:
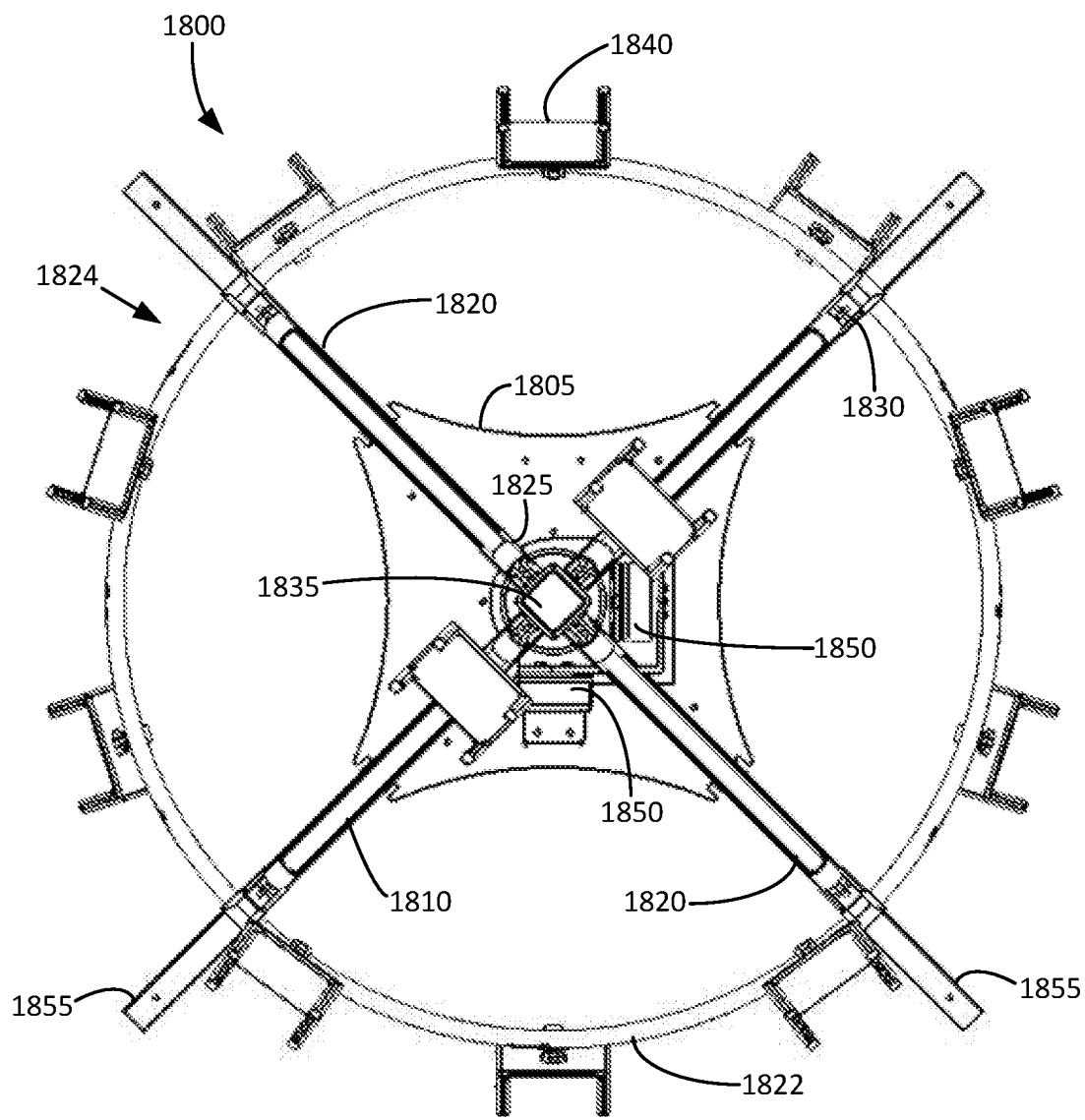
FIG. 23 illustrates a top view of the split dual hemispherical attachment apparatus of FIG. 18 in accordance with various embodiments of the present inventive concept.

FIG. 18 illustrates a first perspective view of a split dual hemispherical attachment apparatus 1800 for a multi-rotor aircraft in accordance with various embodiments of the present inventive concept. FIG. 19 illustrates a second perspective view of the split dual hemispherical attachment apparatus 1800 of FIG. 18. FIG. 20 illustrates a first side elevation view of the split dual hemispherical attachment apparatus 1800 of FIG. 18. FIG. 21 illustrates a second side elevation view of the split dual hemispherical attachment apparatus 1800 of FIG. 18. FIG. 22A illustrates a third side elevation view of the split dual hemispherical attachment apparatus 1800 of FIG. 18. FIG. 22B illustrates a fourth side elevation view of the split dual hemispherical attachment apparatus of FIG. 18 without the gimbal, arms, and base platform. FIG. 23 illustrates a top view of the split dual hemispherical attachment apparatus 1800 of FIG. 18. Reference is now made to FIGS. 18 through 23.

The split dual hemispherical attachment apparatus 1800 can include a light-weight sparse split cage-like structure, which can be coupled to a multi-rotor aircraft, as further described below. The split dual hemispherical attachment apparatus 1800 can include an upper hemispherical assembly 1802 and a lower hemispherical assembly 1804. Although referred to herein as a "split dual hemispherical" attachment apparatus, it will be understood that the attachment apparatus can be of a "split dual cone" configuration, a "split dual cube" configuration, a "split dual pyramid," a "split dual carousel," or the like. In other words, each "hemispherical assembly" can be substantially in the form or shape of a cone, a frustum of a cone, a cube, a pyramid, a carousel, a rectangle, or the like, without departing from the inventive concepts disclosed herein.

Each of the upper hemispherical assembly 1802 and the lower hemispherical assembly 1804 of the split dual hemispherical attachment apparatus 1800 can include an outer frame having multiple rib sections 1820 and 1822. In some embodiments, the rib sections 1822 of each hemispherical assembly (e.g., 1802 and 1804) can form an annular perimeter section 1824. Although referred to herein as an "annular" perimeter section, it will be understood that the perimeter section can be hexagonal, octagonal, square, rectangular, or the like, without departing from the inventive concepts disclosed herein.

In some embodiments, each of the ribs 1822 of the annular perimeter section 1824 can be curved or bowed, and each of the ribs 1820 can be straight. In some embodiments, each of the ribs 1820 can be curved or bowed (not shown). In some embodiments, each of the ribs 1822 can be straight (not shown). The rib sections 1820 of each hemispherical assembly (e.g., 1802 and 1804) can be coupled to joint sections 1830 and a joint section 1825. The joint sections 1830 can be coupled to the annular perimeter section 1824. The joint sections 1825 can be coupled to a vertical support beam 1835.

The joint sections 1825 can be of the same part construction, and therefore can be interchangeable. Similarly, the joint sections 1830 can be of the same part construction, and therefore can be interchangeable. In some embodiments, the split dual hemispherical attachment apparatus 1800 includes eight joint sections 1830, including four joint sections 1830 in each of the upper hemispherical assembly 1802 and the lower hemispherical assembly 1804. In some embodiments, the split dual hemispherical attachment apparatus 1800 includes eight joint sections 1825, including four joint sections 1825 in each of the upper hemispherical assembly 1802 and the lower hemispherical assembly 1804. Each joint section 1825 can have coupled thereto a corresponding rib 1820. Similarly, each joint section 1830 can have coupled thereto a corresponding rib 1820 and/or corresponding ribs 1822. It will be understood that any suitable number of joint sections and ribs can be included in the split dual hemispherical attachment apparatus 1800 without departing from the inventive concepts disclosed herein.

The joint sections 1825 of each hemispherical assembly (e.g., 1802 and 1804) can have four rib sections 1820 extending therefrom. Similarly, the joint sections 1830 of each hemispherical assembly (e.g., 1802 and 1804) can have four rib sections 1820 extending therefrom. Each of the joint sections 1822 of the annular perimeter section 1824 of each hemispherical assembly (e.g., 1802 and 1804) can have two or more rib sections 1822 extending therefrom. The rib sections 1820 and 1822 together can form the outer frame of each of the hemispherical assemblies (e.g., 1802 and 1804). It will be understood that in alternate embodiments, the rib sections 1822 can be straight and the outer frame can form a cube-like outer frame structure, a diamond-like outer frame structure, or other suitably shaped outer frame structures, without departing from the inventive concept disclosed herein. It will also be understood that rather than an 'X' configuration frame structure, a 'Y' configuration frame structure can be used, which can provide 3-axis stabilization.

Each hemispherical assembly (e.g., 1802 and 1804) can include spokes 1810, which can extend between the joint sections 1830 and the vertical support beam 1835. The vertical support beam 1835 can be disposed through a base platform 1805. Each of the spokes 1810 can be coupled to the vertical support beam 1835 and to a corresponding joint section 1830. The vertical support beam 1835 can be coupled to gimbal 1850. The gimbal 1850 can be coupled to the base platform 1805. The gimbal 1850 is described in further detail below.

The split dual hemispherical attachment apparatus 1800 can include multiple holders 1840 attached to the rib sections 1820 and/or 1822 of the outer frame. Each of the holders 1840 can secure a camera, a detector, and/or a sensor. For example, each of the holders 1840 can secure a visible light camera, an infrared camera, a video camera, a still shot camera, a radar detector, a LIDAR sensor, or other suitable sensors, cameras, and/or detectors. The holders 1840 can be interchangeable for other holders. In other words, the holders 1840 can be detached from the rib sections 1820 and/or 1822 of the outer frame and replaced with other kinds of holders 1840 that are suitable for different kinds of cameras, sensors, and/or detectors.

The camera, detector, and/or sensor within each of the holders 1840 can be rotated or otherwise maneuvered to overlap aspect ratios at different locations and in various combinations. For example, keeping a first subset of cameras horizontally oriented while making another subset of cameras vertically oriented can provide a better combination of image overlap. In addition, the mount points for each of the holders 1840 can be changed and adjusted. For example, instead of having the upper hemispherical assembly 1802 cameras set be at a 45 degrees off of horizontal orientation, such cameras can be set at a 60 degrees off of horizontal orientation, etc. The position of the mount points for the holders 1840 can be varied to place the cameras, sensors, or detectors in the desired position for a particular lens viewing angle. The number of holders and associated cameras can be varied depending on the coverage desired. The position of each holder 1840 along each of the ribs 1820 and/or along each of the ribs 1822 can be adjusted according to coverage needs.

Arms 1855 can be coupled to the base platform 1805. The arms 1855 can provide structural support for the motors and propellers of the multi-rotor aircraft, as further described below. In some embodiments, each of four arms 1855 can be coupled to the base platform 1805. The gimbal 1850 can stabilize the vertical support beam 1835 in substantially a perpendicular orientation relative to the surface of the earth even though the base platform 1805 and arms 1855 may tilt, pitch, roll, or yaw with the forces that are exerted by the multi-rotor aircraft.

As shown in FIG. 22B, split dual hemispherical the attachment apparatus 1800 need not have a gimbal 1850, arms 1855, or a base platform 1805. In some embodiments, the split dual hemispherical the attachment apparatus 1800 need not be used with a multi-rotor aircraft. For example, the split dual hemispherical the attachment apparatus 1800 can be attached to a pole or a cable cam (not shown), with or without the gimbal 1850 and associated stabilization features.

Figure 24:
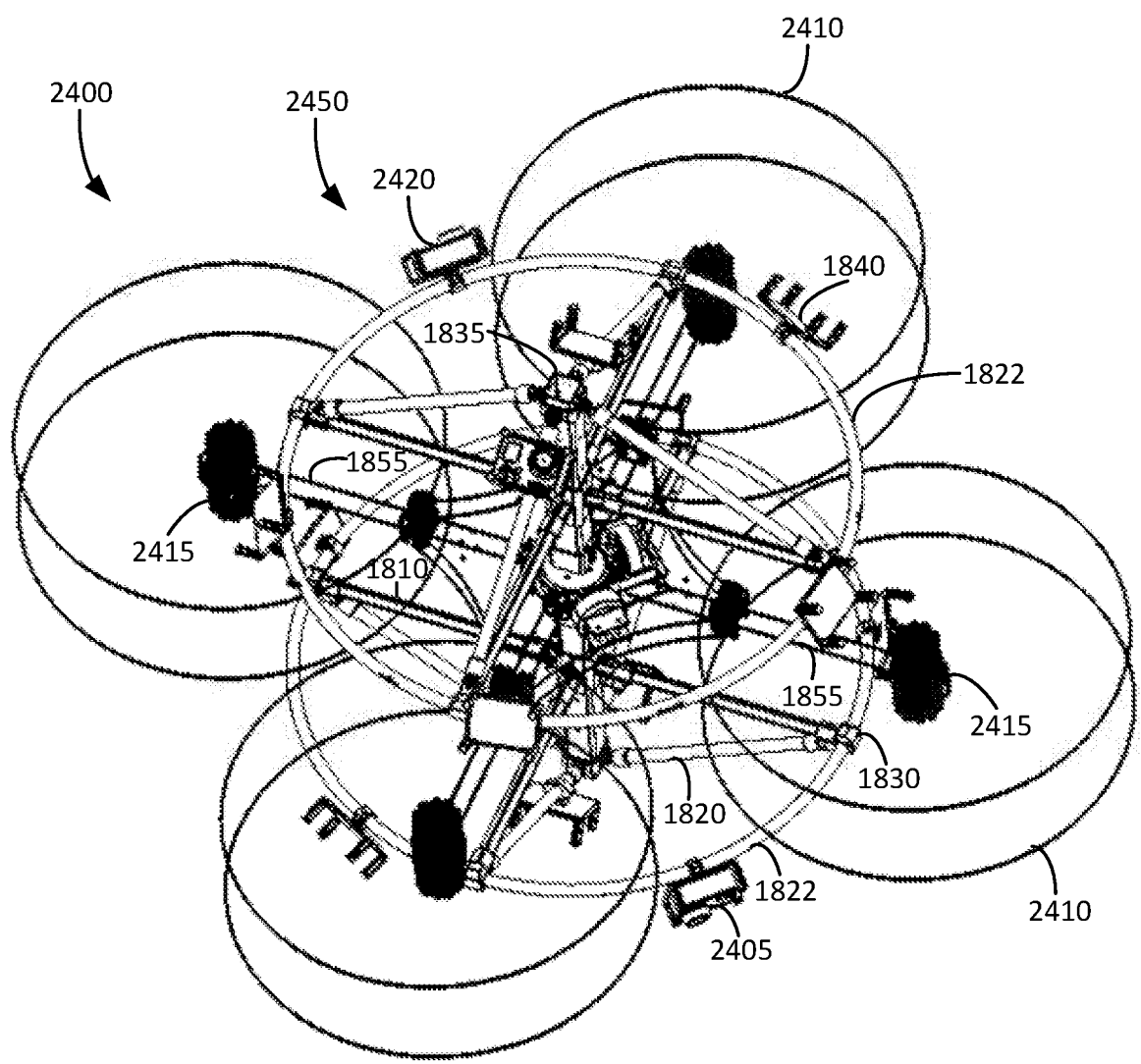
FIG. 24 illustrates a first perspective view of an example split dual hemispherical attachment apparatus and a multi-rotor aircraft in accordance with various embodiments of the present inventive concept.
Figure 25:
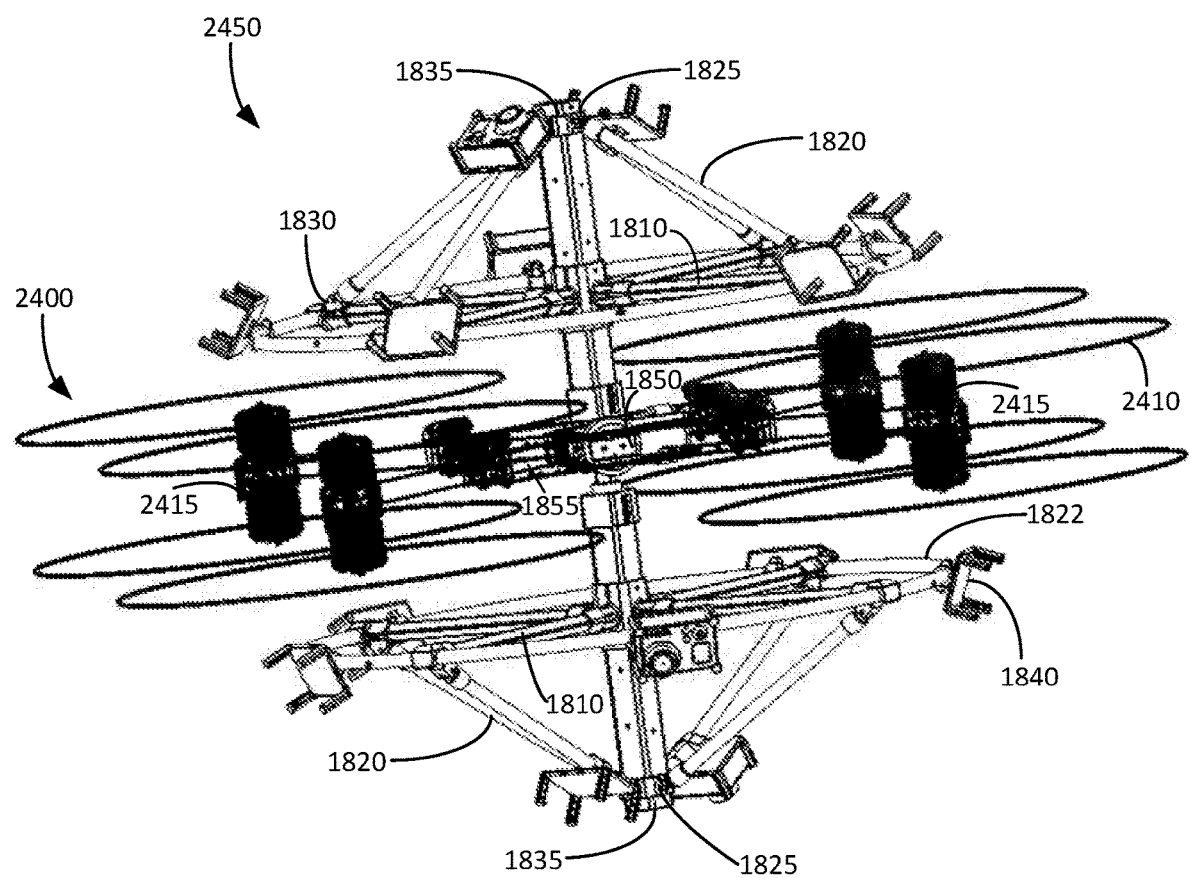
FIG. 25 illustrates a second perspective view of the split dual hemispherical attachment apparatus and the multi-rotor aircraft of FIG. 24 in accordance with various embodiments of the present inventive concept.
Figure 26:
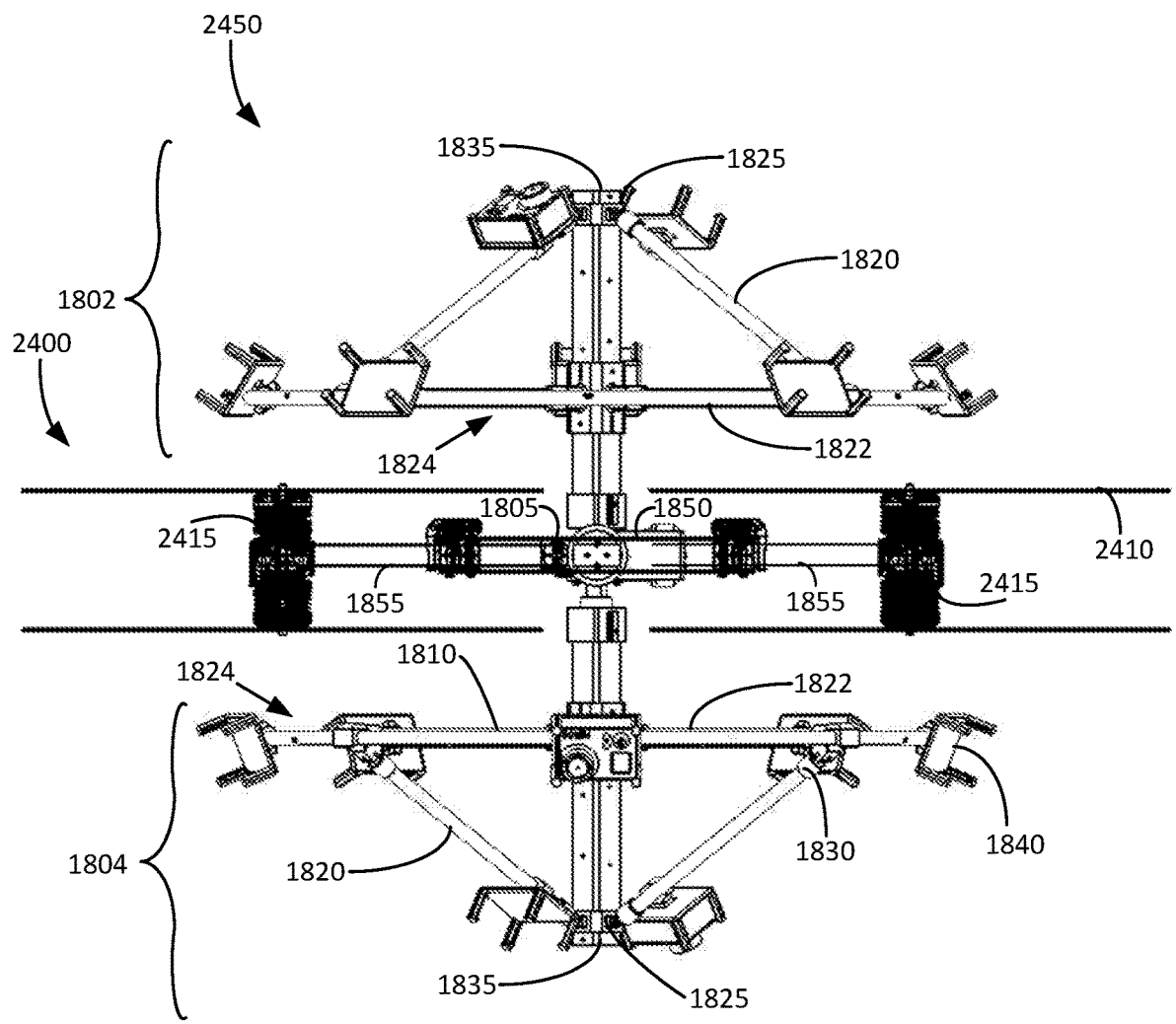
FIG. 26 illustrates a side elevation view of the split dual hemispherical attachment apparatus and the multi-rotor aircraft of FIG. 24 in accordance with various embodiments of the present inventive concept.
Figure 27:
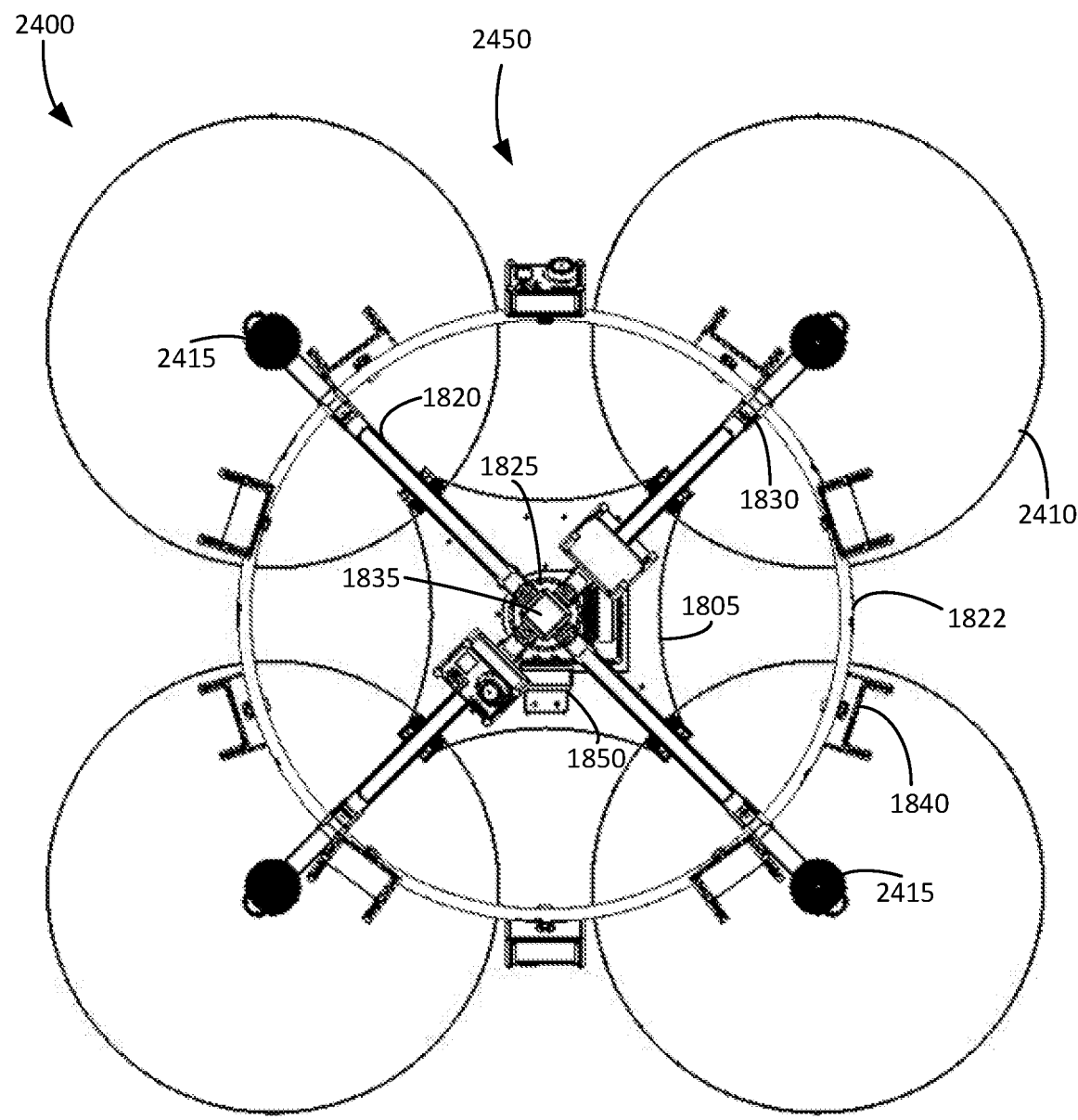
FIG. 27 illustrates a top view of the split dual hemispherical attachment apparatus and the multi-rotor aircraft of FIG. 24 in accordance with various embodiments of the present inventive concept.

FIG. 24 illustrates a first perspective view of a split dual hemispherical attachment apparatus 2450 and a multi-rotor aircraft 2400 in accordance with various embodiments of the present inventive concept. FIG. 25 illustrates a second perspective view of the split dual hemispherical attachment apparatus 2450 and the multi-rotor aircraft 2400 of FIG. 24. FIG. 26 illustrates a side elevation view of the split dual hemispherical attachment apparatus 2450 and the multi-rotor aircraft 2400 of FIG. 24. FIG. 27 illustrates a top view of the split dual hemispherical attachment apparatus 2450 and the multi-rotor aircraft 2400 of FIG. 24. Reference is now made to FIGS. 24 through 27.

The split dual hemispherical attachment apparatus 2450 includes some of the same elements as described above with reference to the attachment apparatus 1800, and therefore, a detailed description of such same elements is not necessarily repeated. It will be understood that any one of the split dual hemispherical attachment apparatus 1210, the split dual hemispherical attachment apparatus 1800 or the split dual hemispherical attachment apparatus 2450 can be used in conjunction with the multi-rotor aircraft 2400. The multi-rotor aircraft 2400 is sometimes referred to as a "drone" or "copter." The multi-rotor aircraft 2400 can include multiple propellers 2410. Each propeller 2410 can be coupled to a corresponding motor 2415, which can be coupled to a corresponding arm (e.g., 1855). It will be understood that a two-blade propeller configuration, a three-blade propeller configuration, a four-blade propeller configuration, etc., and indeed, any suitable number of blade configurations can be used without departing from the inventive concept disclosed herein. Each of the corresponding arms 1855 can be coupled to the multi-rotor aircraft base platform 1805.

The split dual hemispherical attachment apparatus 2450 can be coupled to the multi-rotor aircraft base platform 1805 via the gimbal 1850. For example, the base platform 1805 can be coupled to the gimbal 1850, which can be coupled to the vertical support beam 1835 of the split dual hemispherical attachment apparatus 2450. The gimbal 1850 can keep the vertical support beam 1835 substantially perpendicular with respect to the ground of the earth, so that content can be captured without significant vibration and variation due to movements of the multi-rotor aircraft 2400.

In other words, even when the multi-rotor aircraft 2400 tilts, pans, yaws, and/or otherwise flies around, the gimbal 1850 can keep the split dual hemispherical attachment apparatus 2450 in a substantially same orientation relative to the earth. The base platform 1805 can be a stabilization platform, which can function in tandem with the gimbal 1850 to stabilize the split dual hemispherical attachment apparatus 2450 relative to the earth during flights or movement. Alternatively, the base platform 1805 can be directly attached to the vertical support beam 1835 without the use of the gimbal 1850. The gimbal 1850 can be constructed to accommodate two or three axes of aircraft movement. Having a third axis allows for the stabilization of pan and/or yaw. For example, to accommodate a third axis, the gimbal 1850 can be slightly larger, the multi-rotor aircraft 2400 can have slightly smaller propellers 2410, and/or the multi-rotor aircraft 2400 can have fewer propeller stations 2410 (e.g., such as three pairs of propellers 2410, for a total of six propellers instead of eight). Moreover, the motors for the propellers 2410 can spin relatively faster to maintain lifting capacity and maneuverability with smaller propellers. Accordingly, approximately 30 degrees of pan stability can be achieved.

The positioning of the holders 1840 permit the capturing of seamless content without any view of the propellers 2410 in the content. The cameras, sensors, or other detectors can fit in the holders 1840 and also do not interfere with the airflow of the propellers 2410. For example, the cameras 2405 and 2420 can fit within corresponding holders 1840.

The multi-rotor aircraft 2400 can include landing gear (not shown), which can be attached beneath the aircraft for support while it sits on a table or the ground when the attachment apparatus 2450 is mounted to the multi-rotor aircraft 2400.

Figure 28:
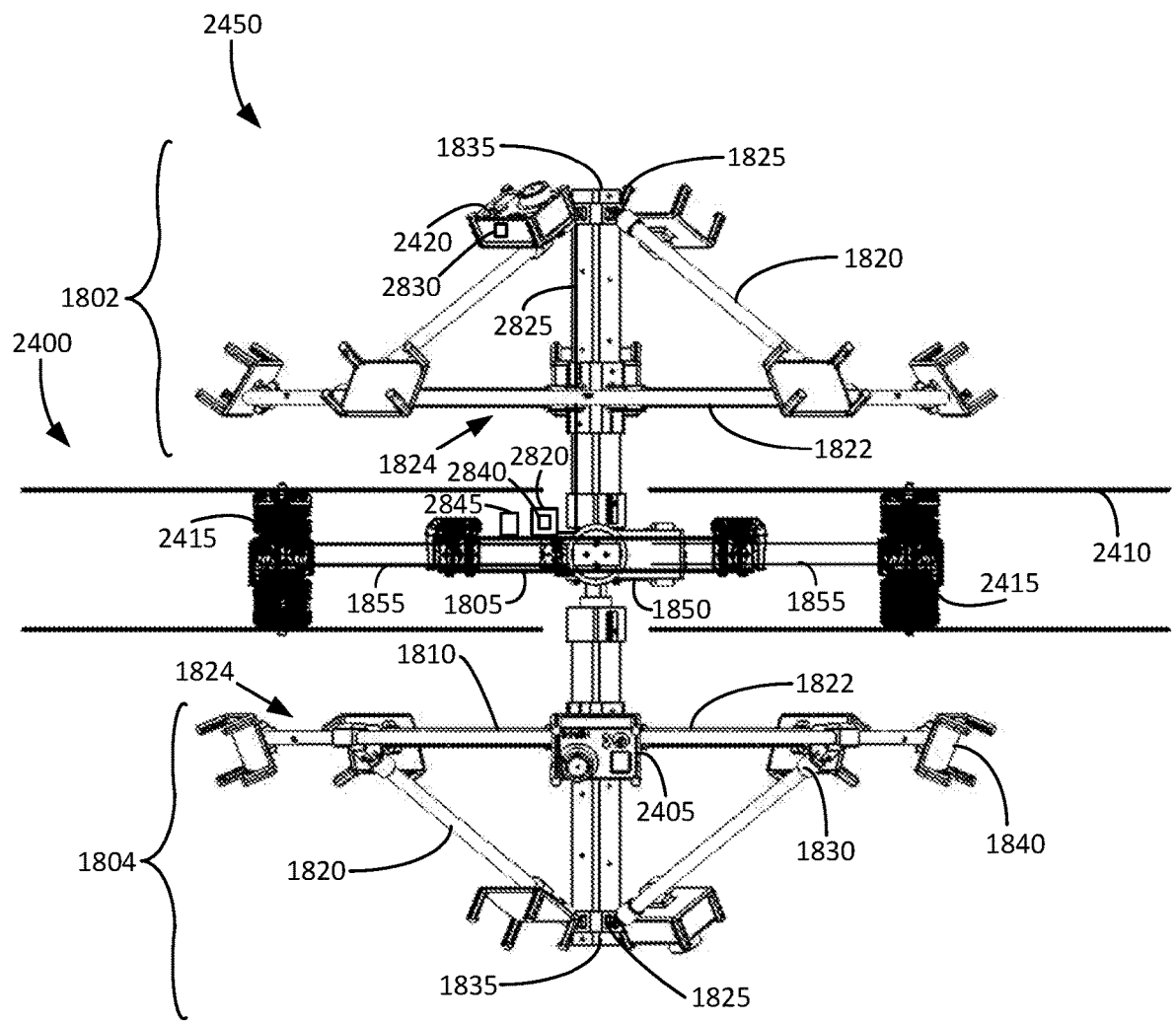
FIG. 28 illustrates a side elevation view of the split dual hemispherical attachment apparatus and the multi-rotor aircraft of FIG. 24, and including one or more processors and a storage section, which can be communicatively coupled to multiple cameras, in accordance with various embodiments of the present inventive concept.

FIG. 28 illustrates a side elevation view of the attachment apparatus 2450 and the multi-rotor aircraft 2400 of FIG. 18, and including one or more processors 2820 and a storage section 2845, which can be communicatively coupled to multiple cameras (e.g., 2405 and 2420), in accordance with various embodiments of the present inventive concept. It will be understood that while items 2405 and 2420 are generally referred to herein as cameras, these can also be any suitable detectors or sensors, as explained above.

The multiple cameras (e.g., 2405 and 2420) can be communicatively coupled to the one or more processors 2820 via conductors 2825. The conductors 2825 can be, for example, wires. The conductors 2825 can be embedded within the rib sections 1820 and/or 1822, the spokes 1810, the vertical support beam 1835, and/or the gimbal 1850. Alternatively or in addition, the conductors 2825 can run along an outer portion of the rib sections 1820 and/or 1822, the spokes 1810, the vertical support beam 1835, and/or the gimbal 1850. Alternatively or in addition, the multiple cameras (e.g., 2405 and 2420) can communicate wirelessly with the one or more processors 2820 via a wireless protocol such as Bluetooth®, WiFi®, or the like.

Content captured from the cameras (e.g., 2405 and 2420), sensors, or other detectors, can be transmitted in real time to the one or more processors 2820 and/or to the storage section 2845. The one or more processors 2820 can include stitching logic 2840, which can stitch in real time the captured content. The one or more processors 2820 can cause the automatically stitched content to be stored in the storage section 2845. The stitched content that can be stored in the storage section 2845 can include one cohesive 360 degree view file, which can then be viewed on a display and/or using a virtual reality headset or device. The automatically stitched virtual reality content can be broadcast to one or more remote devices in real time.

Alternatively or in addition, each camera can include a non-volatile memory card 2830 such as a secure digital (SD) card. Each card 2830 can store captured content for a corresponding one of the cameras (e.g., 2405 and 2420). After a flight has completed, each card 2830 can be removed from the corresponding cameras. The captured content stored in the cards 2830 can then be loaded into a workstation (e.g., computer) and stitched using stitching logic operable on the workstation. The various data streams extracted from the cards 2830 can be stitched into one cohesive 360 degree view file, which can then be viewed on a display and/or using a virtual reality headset or device. Alternatively or in addition, if a sensor or other detector is used in place of a camera, such sensor or other detector can also include a card such as card 2830, which can store content for that particular sensor or detector, and which can be removed and loaded into a workstation for later processing.

It will be understood that the components described with reference to the multi-rotor aircraft 2400 of FIG. 28 can be included on any of the multi-rotor aircraft embodiments described herein.

Figure 29:
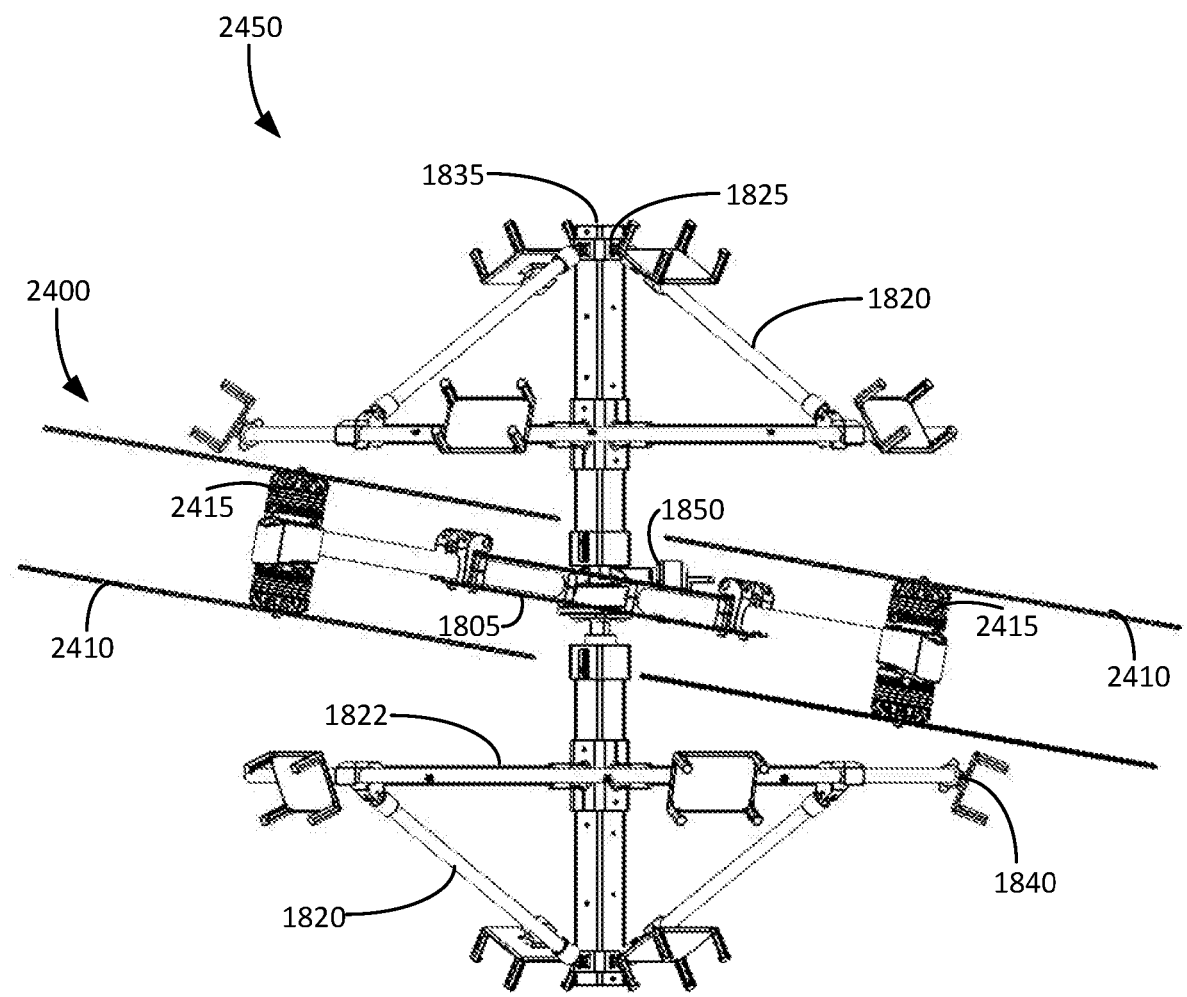
FIG. 29 illustrates a side elevation view of the split dual hemispherical attachment apparatus and the multi-rotor aircraft of FIG. 24 in which the multi-rotor aircraft is tilted (i.e., change of pitch) relative to the split dual hemispherical attachment apparatus, which is stabilized by a gimbal, in accordance with various embodiments of the present inventive concept.

FIG. 29 illustrates a side elevation view of the split dual hemispherical attachment apparatus 2450 and the multi-rotor aircraft 2400 of FIG. 24 in which the multi-rotor aircraft 2400 is tilted (i.e., change of pitch) relative to the split dual hemispherical attachment apparatus 2450, which is stabilized by the gimbal 1850, in accordance with various embodiments of the present inventive concept. Some components are described above and therefore a detailed description of such components is not repeated. As shown in FIG. 29, even when the multi-rotor aircraft 2400 tilts, pans, yaws, and/or otherwise flies around, the gimbal 1850 can keep the split dual hemispherical attachment apparatus 2450 in a substantially same orientation relative to the earth. More specifically, the gimbal 1850 can stabilize the vertical support beam 1835 in substantially a perpendicular orientation relative to the surface of the earth even though the base platform 1805 and arms 1855 may tilt, pitch, roll, or yaw with the forces that are exerted by the motors 2415 of the multi-rotor aircraft 2400.

Figure 30A:
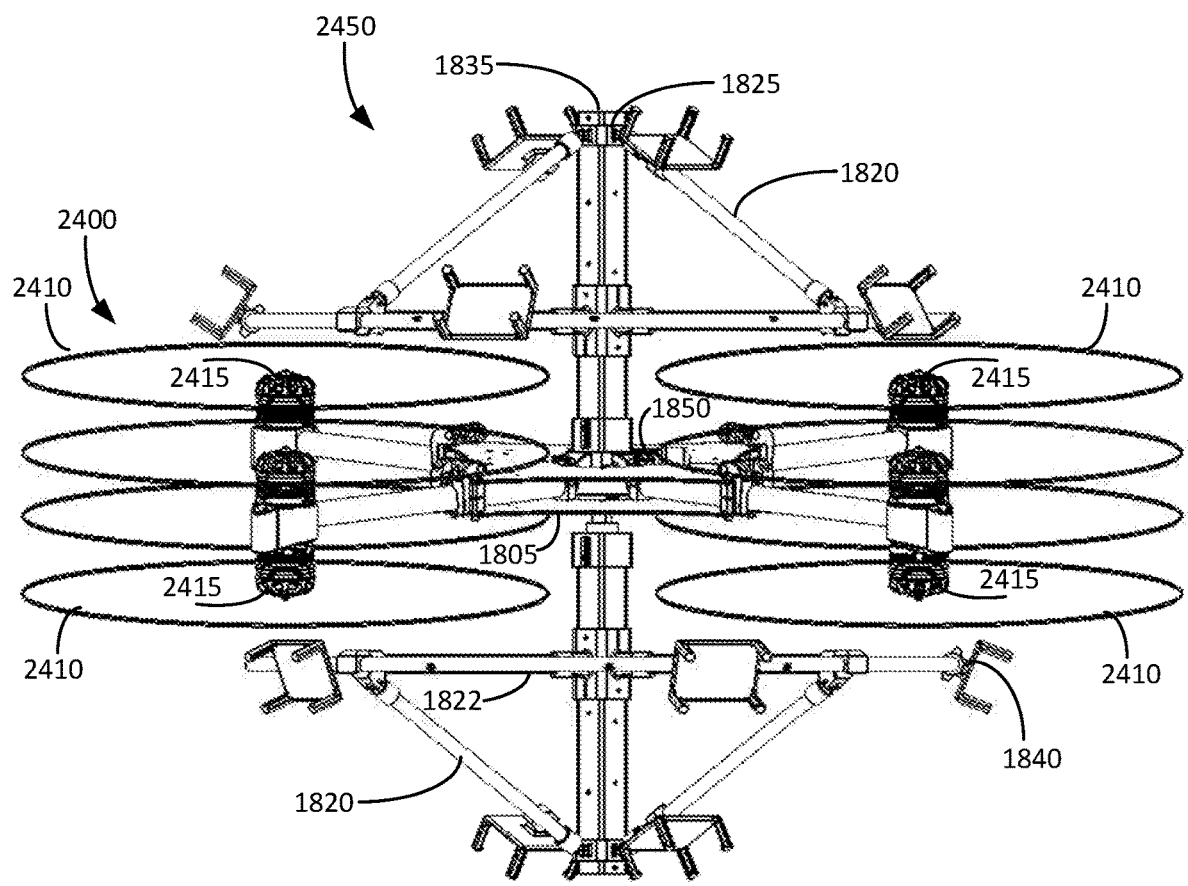
FIG. 30A illustrates a side elevation view of the split dual hemispherical attachment apparatus and the multi-rotor aircraft of FIG. 24 in which the multi-rotor aircraft is tilted (i.e., change of roll) relative to the split dual hemispherical attachment apparatus, which is stabilized by a gimbal, in accordance with various embodiments of the present inventive concept.
Figure 30B:
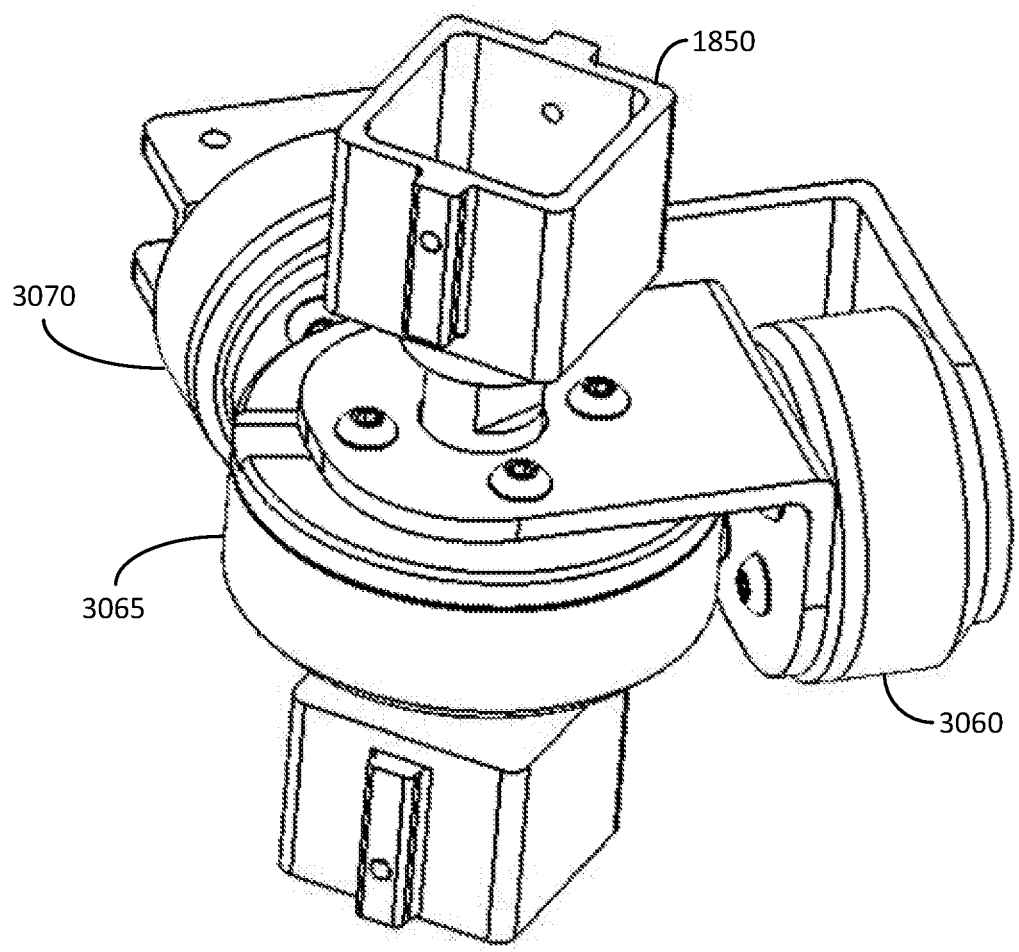
FIG. 30B illustrates a perspective view of the gimbal used with the dual hemispherical attachment apparatus of and the multi-rotor aircraft of FIG. 24 in accordance with various embodiments of the present inventive concept.

FIG. 30A illustrates a side elevation view of the split dual hemispherical attachment apparatus 2450 and the multi-rotor aircraft 2400 of FIG. 24 in which the multi-rotor aircraft 2400 is tilted (i.e., change of roll) relative to the split dual hemispherical attachment apparatus 2450, which is stabilized by the gimbal 1850, in accordance with various embodiments of the present inventive concept. FIG. 30B illustrates a perspective view of the gimbal used with the dual hemispherical attachment apparatus of and the multi-rotor aircraft of FIG. 24 in accordance with various embodiments of the present inventive concept. Reference is now made to FIGS. 30A and 30B.

As explained above, the gimbal 1850 can stabilize the vertical support beam 1835 in substantially a perpendicular orientation relative to the surface of the earth even though the base platform 1805 and arms 1855 may tilt, pitch, roll, or yaw with the forces that are exerted by the motors 2415 of the multi-rotor aircraft 2400. The gimbal 1850 can include stabilization motors (e.g., 3060, 3065, and 3070), which can provide 3-axis stabilization. It will be understood that the 3-axis stabilization gimbal 1850 as illustrated in FIG. 30B can be included on any of the multi-rotor aircraft embodiments described herein.

Figure 31:
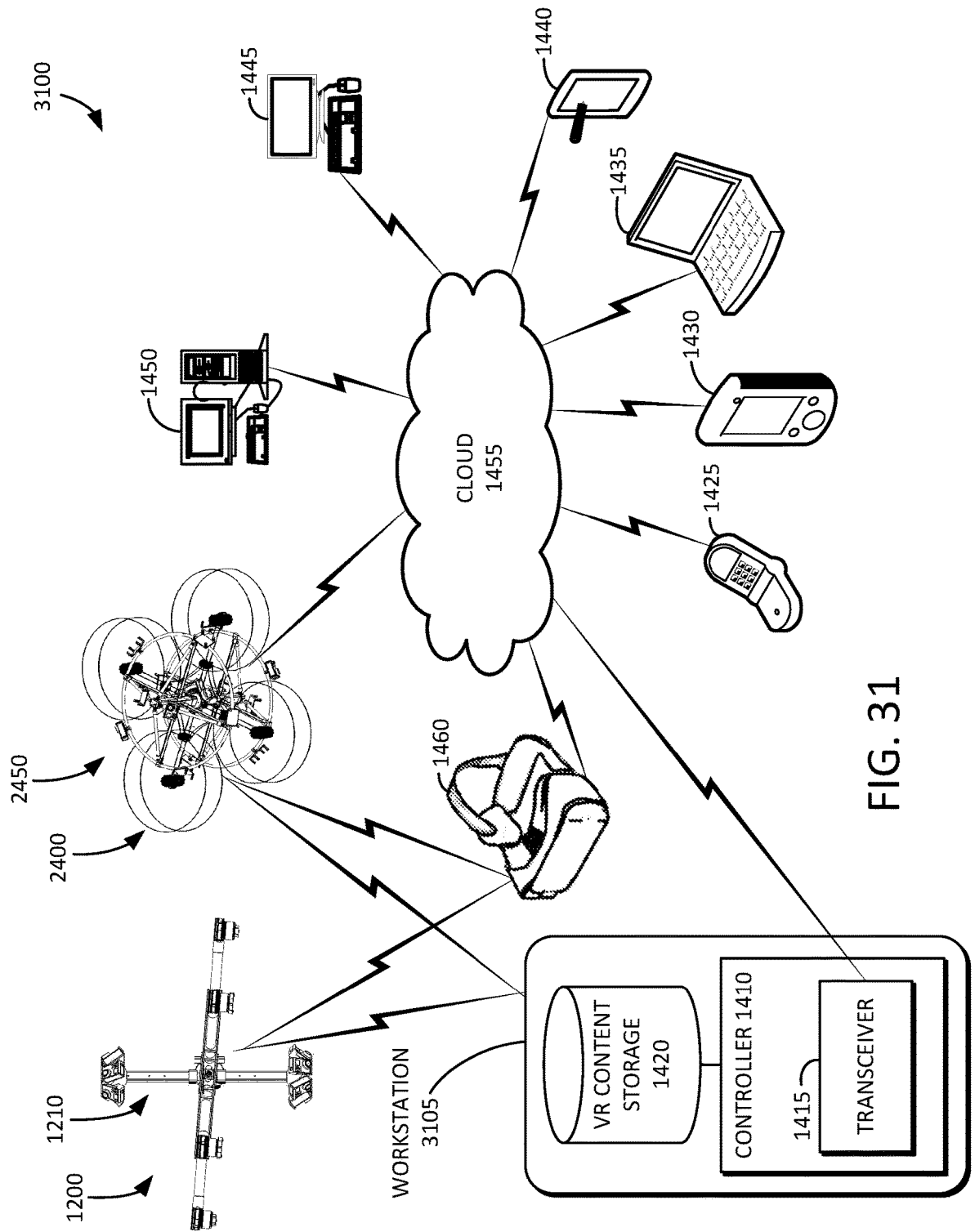
FIG. 31 illustrates an example content capture and virtual reality content production system in accordance with various embodiments of the present inventive concept.

FIG. 31 illustrates a content capture and virtual reality content production system 3100 in accordance with various embodiments of the present inventive concept. The content capture and virtual reality content production system 3100 can include a multi-rotor aircraft (e.g., 2400), which can have coupled thereto an attachment apparatus (e.g., 2450 and 1800). The content and virtual reality content production system 3100 can include a multi-rotor aircraft (e.g., 1200), which can have coupled thereto an attachment apparatus 1210. The multi-rotor aircrafts (e.g., 1200 and 2400) can be configured to wirelessly communicate with a virtual reality headgear apparatus 1460, a workstation 3105, and/or a cloud 1455. The workstation 3105 can include a controller 1410, a transceiver 1415, and/or a virtual reality content storage section 1420.

The cameras, sensors, or other detectors coupled to the attachment apparatus 2450 and/or the attachment apparatus 1210 can capture stabilized content while the associated multi-rotor aircrafts (e.g., 1200 or 2400) are flying, stitch the stabilized content on-the-fly, as described above, and/or transmit the stitched content substantially in real time to the transceiver 1415 and/or to the cloud 1455. The controller 1410 can cause the automatically stitched virtual reality content to be stored in the virtual reality content storage section 1420 and/or in the virtual reality headgear apparatus 1460. Alternatively or in addition, the virtual reality headgear apparatus 1460 can access the stitched content via the cloud 1455. Moreover, other devices such as phone 1425, smart phone 1430, laptop 1435, tablet 1440, terminal 1445, and/or personal computer 1450 can access the stitched virtual reality content from the workstation 3105 via the cloud 1455 and/or directly from the multi-rotor aircraft 2400. Alternatively or in addition, the devices such as the virtual reality headgear apparatus 1460, the phone 1425, the smart phone 1430, the laptop 1435, the tablet 1440, the terminal 1445, and/or the personal computer 1450 can send one or more control signals to the multi-rotor aircraft 2400.

Figure 32:
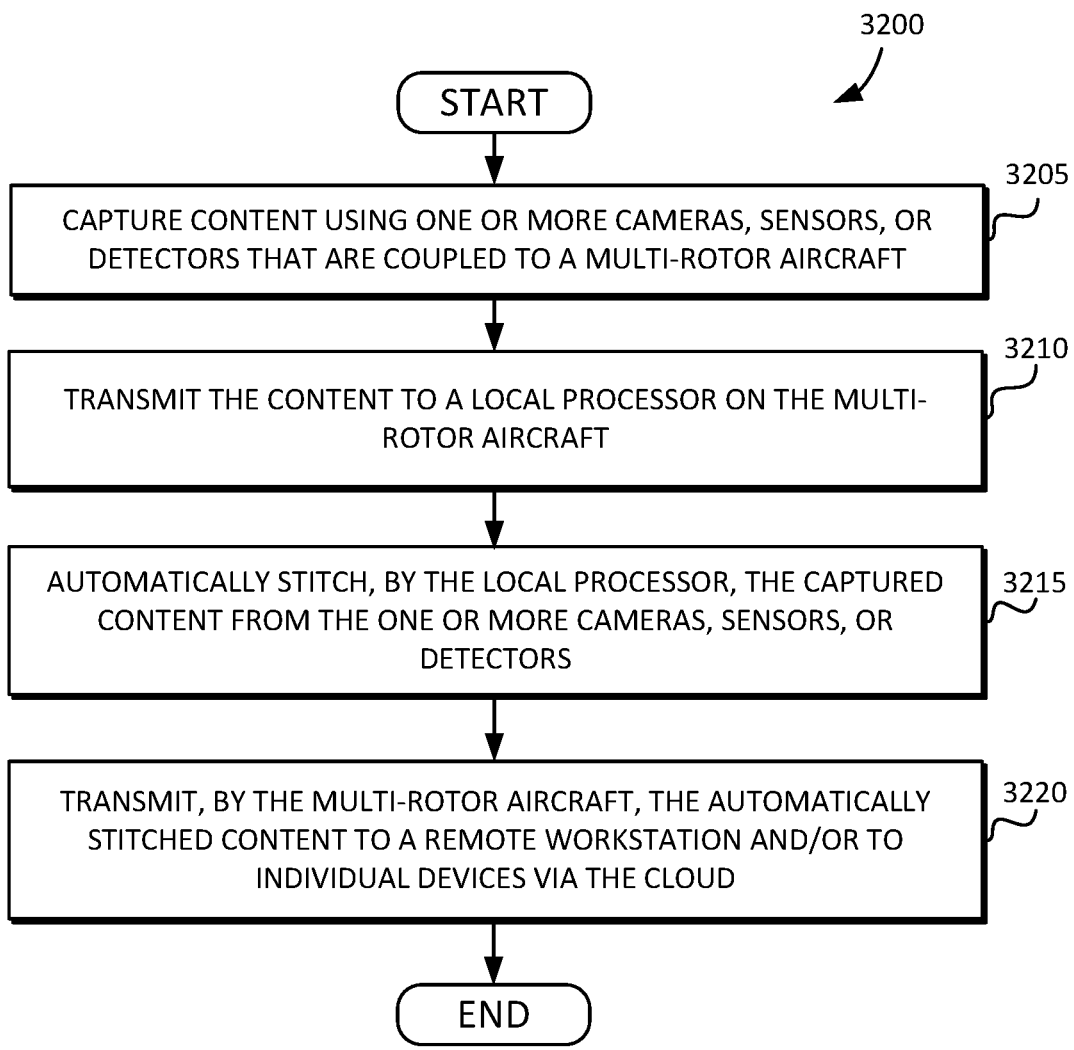
FIG. 32 is a flow diagram illustrating an example technique for capturing content and producing virtual reality content in accordance with various embodiments of the present inventive concept.

FIG. 32 is a flow diagram 3200 illustrating a technique for capturing content and producing virtual reality content in accordance with various embodiments of the present inventive concept. The technique can begin at 3205, where content can be captured using one or more cameras, sensors, or detectors that are coupled to a multi-rotor aircraft. At 3210, the captured content can be transmitted substantially in real time to a local processor on the multi-rotor aircraft. At 3215, the local processor can cause the content to be automatically stitched. At 3220, the multi-rotor aircraft can transmit, either wirelessly or via a conductor such as a wire, the automatically stitched content to a remote workstation and/or to individual devices. In some embodiments, the content can be transmitted via the cloud.

Figure 33:
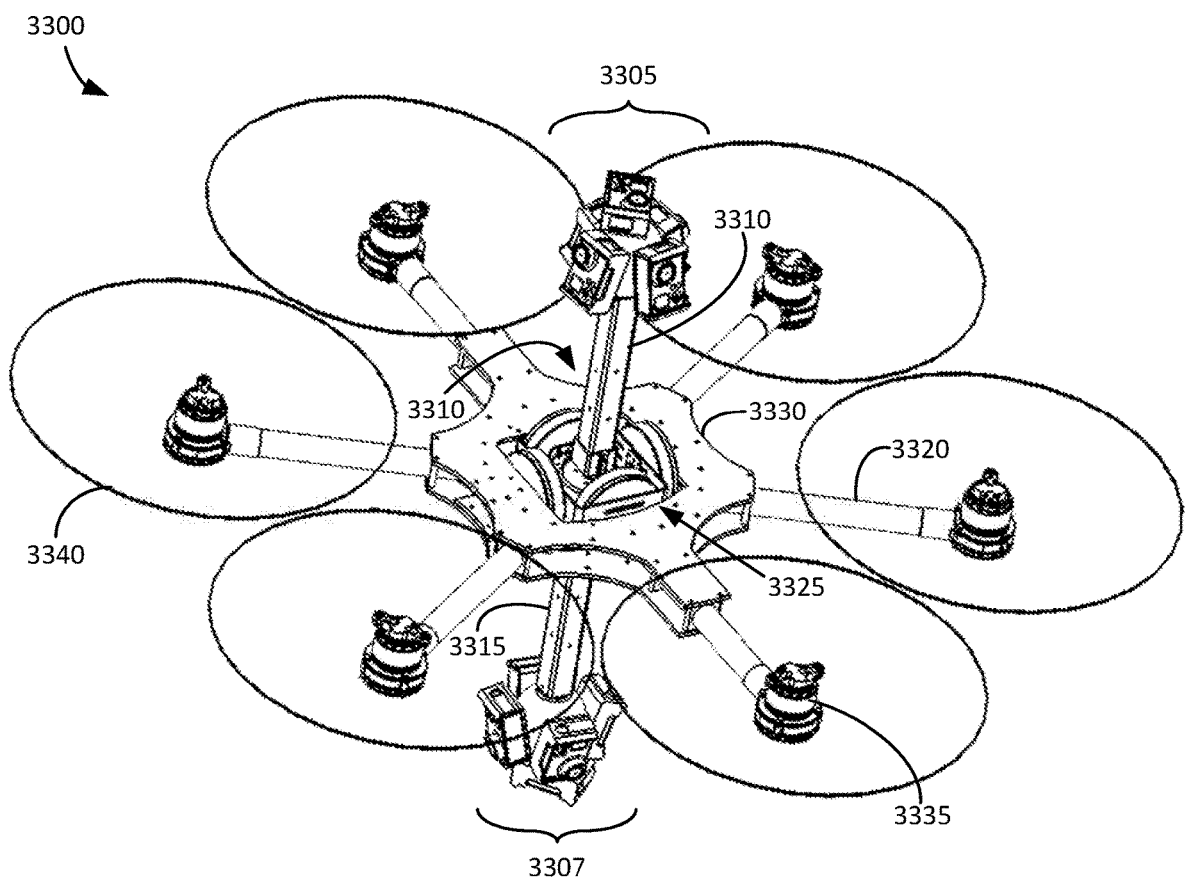
FIG. 33 illustrates a perspective view of yet another example multi-rotor aircraft in accordance with various embodiments of the present inventive concept.

FIG. 33 illustrates a perspective view of yet another example multi-rotor aircraft 3300 in accordance with various embodiments of the present inventive concept. The multi-rotor aircraft 3300 can include a dual globular attachment apparatus 3310. The dual globular attachment apparatus 3310 can include an upper globular assembly 3305, a lower globular assembly 3307, an upper vertical support beam 3310, and a lower vertical support beam 3315. The upper vertical support beam 3310 can be coupled to a gimbal 3325. In addition, the lower vertical support beam 3315 can be coupled to the gimbal 3325. The upper globular attachment assembly 3305 can be coupled to the upper vertical support beam 3310. The lower globular attachment assembly 3307 can be coupled to the lower vertical support beam 3315.

The multi-rotor aircraft 3300 can include a base platform 3330. Moreover, the multi-rotor aircraft 3300 can include arms 3320 extending radially from the base platform 3330. The multi-rotor aircraft 3300 can include propeller motors 3335 each coupled to a corresponding one of the arms 3320. The multi-rotor aircraft 3300 can include propellers (e.g., 3340) each coupled to a corresponding one of the propeller motors 3335. The gimbal 3325 can be coupled to the base platform 3330.

The gimbal 3325 can maintain the upper vertical support beam 3310 and the lower vertical support beam 3315 in a vertical orientation relative to a ground surface during flight of the multi-rotor aircraft 3300. The gimbal 3325 can stabilize the vertical support beams 3310 and 3315 in substantially a perpendicular orientation relative to the surface of the earth even though the base platform 3330 and arms 3320 may tilt, pitch, roll, or yaw with the forces that are exerted by the multi-rotor aircraft 3300.

The multi-rotor aircraft 3300 is sometimes referred to as a "drone" or "copter." The multi-rotor aircraft 3300 can include multiple propellers 3340. Each propeller 3340 can be coupled to a corresponding motor 3335, which can be coupled to a corresponding arm (e.g., 3320). It will be understood that a two-blade propeller configuration, a three-blade propeller configuration, a four-blade propeller configuration, etc., and indeed, any suitable number of blade configurations can be used without departing from the inventive concept disclosed herein. Each of the corresponding arms 3320 can be coupled to the multi-rotor aircraft base platform 3330.

The dual globular attachment apparatus 3310 can be coupled to the multi-rotor aircraft base platform 3330 via the gimbal 3325. For example, the base platform 3330 can be coupled to the gimbal 3325, which can be coupled to the vertical support beams (e.g., 3310 and 3315) of the dual globular attachment apparatus 3310. The gimbal 3325 can keep the vertical support beams (e.g., 3310 and 3315) substantially perpendicular with respect to the ground of the earth, so that content can be captured without significant vibration and variation due to movements of the multi-rotor aircraft 3300.

In other words, even when the multi-rotor aircraft 3300 tilts, pans, yaws, and/or otherwise flies around, the gimbal 3325 can keep the dual globular attachment apparatus 3330 in a substantially same orientation relative to the earth. The base platform 3330 can be a stabilization platform, which can function in tandem with the gimbal 3325 to stabilize the dual globular apparatus 3310 relative to the earth during flights or movement. Alternatively, the base platform 3330 can be directly attached to the vertical support beams (e.g., 3310 and 3315) without the use of the gimbal 3325. The gimbal 3325 can be constructed to accommodate multiple axes of aircraft movement, as further described below.

The multi-rotor aircraft 3300 can include landing gear (not shown), which can be attached beneath the aircraft for support while it sits on a table or the ground when the attachment apparatus 3310 is mounted to the multi-rotor aircraft 3300. It will be understood that the gimbal 3325 can be used in any other embodiment of the various multi-rotor aircrafts described herein. It will also be understood that the dual globular attachment apparatus 3310 can be used in any other embodiment of the various multi-rotor aircrafts described herein. Indeed, any combination of sections from the various multi-rotor aircrafts described herein can be combined with other sections of other multi-rotor aircrafts described herein without departing from the inventive aspects described herein.

Figure 34:
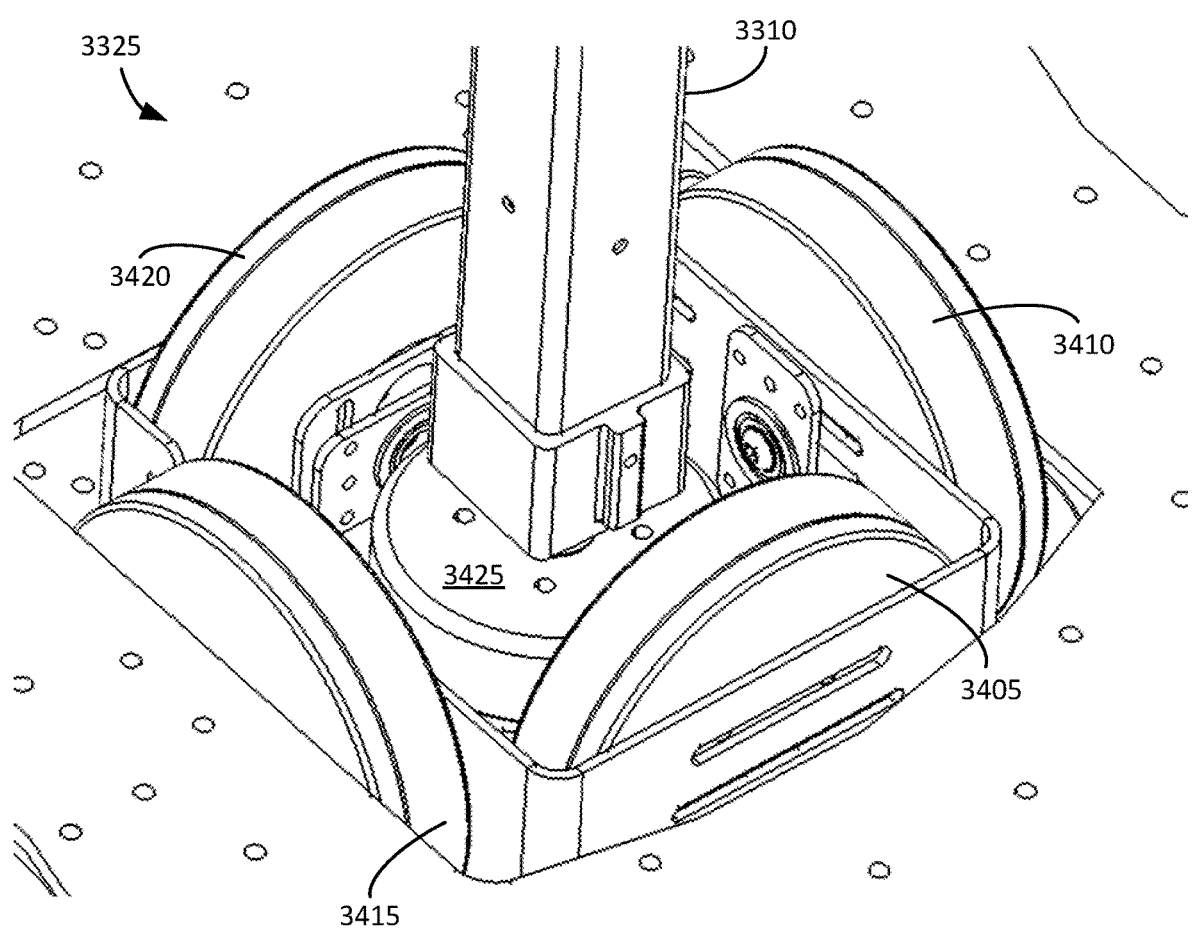
FIG. 34 illustrates a perspective view of a gimbal used with the multi-rotor aircraft of FIG. 33 in accordance with various embodiments of the present inventive concept.

FIG. 34 illustrates a perspective view of the gimbal 3325 used with the multi-rotor aircraft 3300 of FIG. 33 in accordance with various embodiments of the present inventive concept. The gimbal 3325 can include five separate motors 3405, 3410, 3415, 3420, and 3425. In some embodiments, two motors can control tilt, two motors can control roll, and one motor can control pan. For example, motors 3405 and 3420 can control tilt, motors 3410 and 3415 can control roll, and motor 3425 can control pan. Multiple motors working in cooperation can provide additional stabilization and control of the dual globular attachment apparatus 3310.

Figure 35:
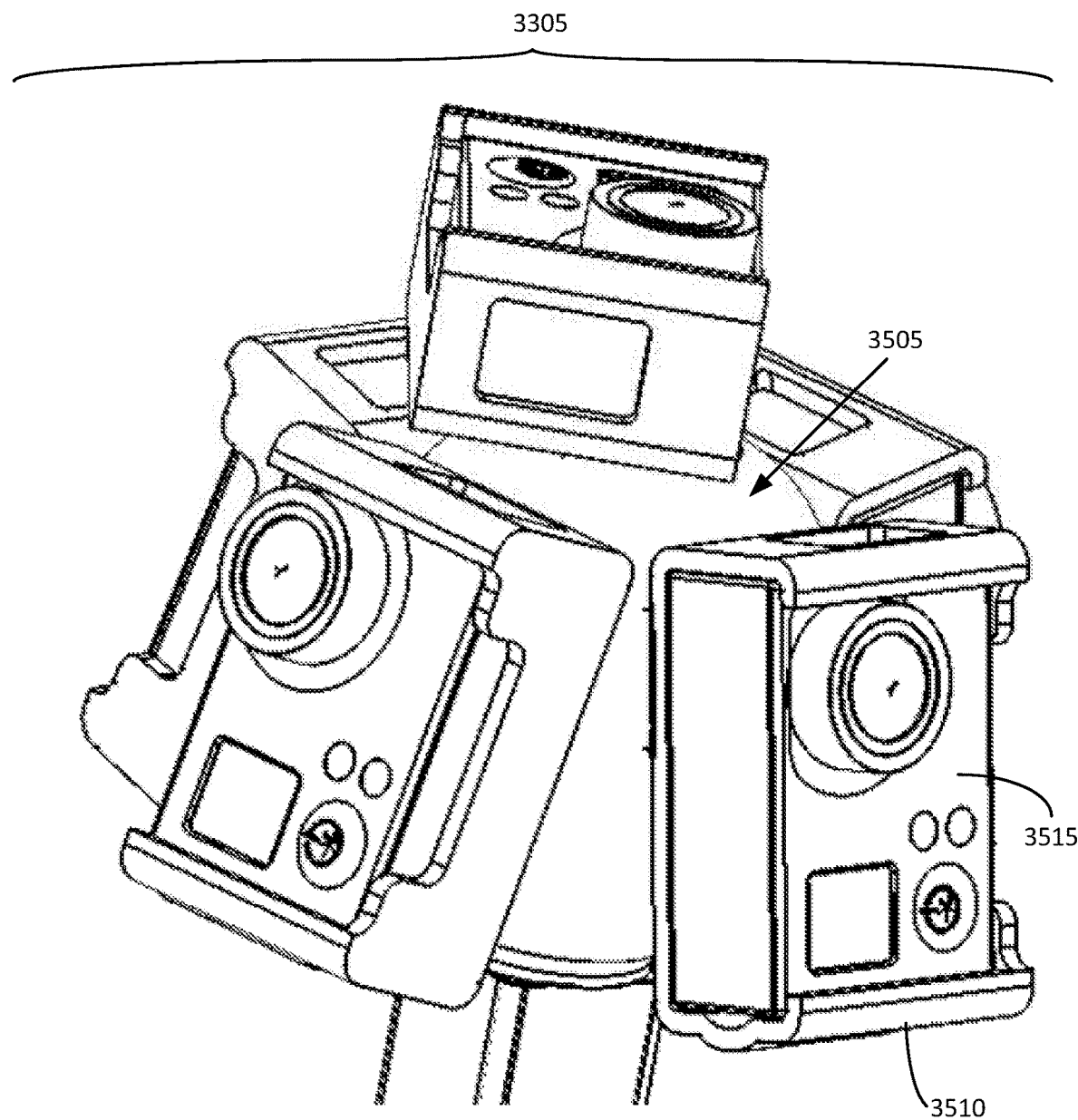
FIG. 35 illustrates a perspective view of an example globular base of a dual globular attachment assembly of the multi-rotor aircraft of FIG. 33, including camera receptacles attached thereto, and cameras disposed in the camera receptacles, in accordance with various embodiments of the present inventive concept.

FIG. 35 illustrates a perspective view of an example globular base 3505 of a dual globular attachment assembly 3305 of the multi-rotor aircraft 3300 of FIG. 33, including camera receptacles 3510 attached thereto, and cameras 3515 disposed in the camera receptacles, in accordance with various embodiments of the present inventive concept. The camera receptacles 3510 and corresponding cameras 3515 therein can be disposed at various locations around the globular base 3505, and/or atop the globular base 3505, each facing outward away from the multi-rotor aircraft 3300. In some embodiments, the camera receptacles 3510 are coupled to the globular base 3505 using similar means as described above.

Some embodiments include a hemispherical attachment apparatus for a multi-rotor aircraft. The hemispherical attachment apparatus can include a hemispherical base including a plurality of receptacle notches. The hemispherical attachment apparatus can include a vertical support beam attachment section configured to receive a vertical support beam. The hemispherical attachment apparatus can include a plurality of receptacles each being attachable to a corresponding one of the receptacle notches of the hemispherical base.

In some embodiments, the plurality of receptacles are seated in the receptacle notches at particular angles that are configured to cause cameras attached to the plurality of receptacles to eliminate any parallax point and propellers of the multi-rotor aircraft from a 360 degree view. In some embodiments, the plurality of receptacles include a plurality of camera receptacles each configured to receive and secure a corresponding camera.

In some embodiments, each of the plurality of receptacle notches includes a first level attachment section having a first depth and a second level attachment section having a second depth. In some embodiments, the first and second level attachment sections are configured to receive and secure a corresponding receptacle from among the plurality of receptacles. In some embodiments, an inside of the hemispherical base is solid throughout. In some embodiments, an inside of the hemispherical base is hollow.

In some embodiments, each of the plurality of receptacle notches includes a primary contact surface configured to make primary contact with a corresponding receptacle from among the plurality of receptacles. In some embodiments, each of the plurality of receptacle notches includes a radial sidewall extending in substantially a radial direction from a center region of the hemispherical base. In some embodiments, each of the plurality of receptacle notches includes an inner sidewall extending from the radial sidewall. In some embodiments, each of the plurality of receptacle notches includes an outer edge defining an outer perimeter of the primary contact surface.

In some embodiments, each of the plurality of receptacles includes an elongate primary wall configured to make primary contact with a corresponding receptacle notch from among the plurality of receptacle notches. In some embodiments, each of the plurality of receptacles includes a first sidewall including a through hole. In some embodiments, each of the plurality of receptacles includes a second sidewall extending from the first sidewall. In some embodiments, each of the plurality of receptacles includes a third sidewall including a rectangular opening, and extending from the second sidewall.

In some embodiments, each of the plurality of receptacles includes an open side configured to receive a corresponding camera. In some embodiments, each of the plurality of receptacles is coupled to a corresponding one of the receptacle notches from among the plurality of receptacle notches.

Some embodiments include a multi-rotor aircraft. In some embodiments, the multi-rotor aircraft includes a base platform. In some embodiments, the multi-rotor aircraft includes a plurality of arms extending radially from the base platform. In some embodiments, the multi-rotor aircraft includes a plurality of propeller motors each coupled to a corresponding one of the arms. In some embodiments, the multi-rotor aircraft includes a plurality of propellers each coupled to a corresponding one of the propeller motors. In some embodiments, the multi-rotor aircraft includes a gimbal coupled to the base platform. In some embodiments, the multi-rotor aircraft includes one or more vertical support beams coupled to the gimbal. In some embodiments, the multi-rotor aircraft includes one or more hemispherical attachment assemblies coupled to the one or more vertical support beams.

In some embodiments, the gimbal is configured to maintain the one or more vertical support beams in a vertical orientation relative to a ground surface during flight. In some embodiments, the gimbal includes a first gimbal motor configured to tilt the one or more vertical support beams in a first direction. In some embodiments, the gimbal includes a second gimbal motor configured to tilt the one or more vertical support beams in a second direction. In some embodiments, each of the one or more hemispherical attachment assemblies further comprises a hemispherical base including a plurality of receptacle notches. In some embodiments, each of the one or more hemispherical attachment assemblies further comprises a vertical support beam attachment section configured to receive the one or more vertical support beams. In some embodiments, each of the one or prises a plurality of receptacles each being attachable to a corresponding one of the receptacle notches of the hemispherical base.

In some embodiments, the plurality of receptacles are seated in the receptacle notches at particular angles that are configured to cause cameras attached to the plurality of receptacles to eliminate any parallax point and the plurality of propellers of the multi-rotor aircraft from a 360 degree view.

In some embodiments, each of the plurality of receptacle notches includes a primary contact surface configured to make primary contact with a corresponding receptacle from among the plurality of receptacles. In some embodiments, each of the plurality of receptacle notches includes a radial sidewall extending in substantially a radial direction from a center region of the hemispherical base. In some embodiments, each of the plurality of receptacle notches includes an inner sidewall extending from the radial sidewall. In some embodiments, each of the plurality of receptacle notches includes an outer edge defining an outer perimeter of the primary contact surface.

In some embodiments, each of the plurality of receptacles includes an elongate primary wall configured to make primary contact with a corresponding receptacle notch from among the plurality of receptacle notches. In some embodiments, each of the plurality of receptacles includes a first sidewall including a through hole. In some embodiments, each of the plurality of receptacles includes a second sidewall extending from the first sidewall. In some embodiments, each of the plurality of receptacles includes a third sidewall including a rectangular opening, and extending from the second sidewall.

In some embodiments, the gimbal includes a first bracket coupled to a first gimbal motor, and a second bracket coupled to a second gimbal motor. In some embodiments, the one or more vertical support beams include an upper vertical support beam coupled to the first bracket of the gimbal, and a lower vertical support beam coupled to the first bracket of the gimbal. In some embodiments, the one or more hemispherical attachment assemblies includes an upper hemispherical attachment assembly coupled to the upper vertical support beam, and a lower hemispherical attachment assembly coupled to the lower vertical support beam. In some embodiments, the first gimbal motor is configured to rotate the first bracket and tilt the first vertical support beam and the second vertical support beam in a first or second direction. In some embodiments, the second gimbal motor is configured to rotate the second bracket and tilt the first vertical support beam and the second vertical support beam in a third or fourth direction.

In some embodiments, the multi-rotor aircraft includes a processor including stitching logic configured to process and stitch stabilized virtual reality content, and transmit, in real time, the stitched virtual reality content to one or more remote devices.

Embodiments are described herein, and illustrated in the drawings, in terms of functional blocks, units and/or modules. Those skilled in the art will appreciate that these blocks, units and/or modules can be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

The following discussion is intended to provide a brief, general description of a suitable machine or machines in which certain aspects of the inventive concept can be implemented. Typically, the machine or machines include a system bus to which is attached processors, memory, e.g., random access memory (RAM), read-only memory (ROM), or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the inventive concept can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format.

Associated data can be used in a distributed environment, and stored locally and/or remotely for machine access.

Having described and illustrated the principles of the inventive concept with reference to illustrated embodiments, it will be recognized that the illustrated embodiments can be modified in arrangement and detail without departing from such principles, and can be combined in any desired manner And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the inventive concept to particular embodiment configurations. As used herein, these terms can reference the same or different embodiments that are combinable into other embodiments.

Embodiments of the invention may include a non-transitory machine-readable medium comprising instructions executable by one or more processors, the instructions comprising instructions to perform the elements of the embodiments as described herein.

Consequently, in view of the wide variety of permutations to the embodiments described herein, this detailed description and accompanying material is intended to be illustrative only, and should not be taken as limiting the scope of the inventive concept. What is claimed as the invention, therefore, is all such modifications as may come within the scope and spirit of the following claims and equivalents thereto.

The invention claimed is:

1. A multi-rotor aircraft, comprising,
a base platform;
a plurality of arms extending radially from the base platform;
a plurality of propeller motors each coupled to a corresponding one of the arms;
a plurality of propellers each coupled to a corresponding one of the propeller motors;
a gimbal coupled to the base platform;
one or more vertical support beams coupled to the gimbal; and
one or more hemispherical attachment assemblies coupled to the one or more vertical support beams,
wherein each of the one or more hemispherical attachment assemblies further comprises:
a hemispherical base including a plurality of receptacle notches;
a vertical support beam attachment section configured to receive the one or more vertical support beams; and
a plurality of receptacles each being attachable to a corresponding one of the receptacle notches of the hemispherical base; and
wherein each of the plurality of receptacle notches includes:
a primary contact surface configured to make primary contact with a corresponding receptacle from among the plurality of receptacles;
a radial sidewall extending in substantially a radial direction from a center region of the hemispherical base;
an inner sidewall extending from the radial sidewall; and
an outer edge defining an outer perimeter of the primary contact surface.

2. The multi-rotor aircraft of claim 1, wherein the gimbal is configured to maintain the one or more vertical support beams in a vertical orientation relative to a ground surface during flight.

3. The multi-rotor aircraft of claim 2, wherein the gimbal includes:
a first gimbal motor configured to tilt the one or more vertical support beams in a first direction; and
a second gimbal motor configured to tilt the one or more vertical support beams in a second direction.

4. The multi-rotor aircraft of claim 1, wherein the plurality of receptacles are seated in the receptacle notches at particular angles that are configured to cause cameras attached to the plurality of receptacles to eliminate any parallax point and the plurality of propellers of the multi-rotor aircraft from a 360 degree view.

5. The multi-rotor aircraft of claim 1, further comprising a plurality of cameras and a processor including stitching logic configured to process and stitch stabilized virtual reality content captured by the plurality of cameras, and transmit, in real time, the stitched virtual reality content to one or more remote devices.

6. A multi-rotor aircraft, comprising,
a base platform;
a plurality of arms extending radially from the base platform;
a plurality of propeller motors each coupled to a corresponding one of the arms;
a plurality of propellers each coupled to a corresponding one of the propeller motors;
a gimbal coupled to the base platform;
one or more vertical support beams coupled to the gimbal; and
one or more hemispherical attachment assemblies coupled to the one or more vertical support beams,
wherein each of the one or more hemispherical attachment assemblies further comprises:
a hemispherical base including a plurality of receptacle notches;
a vertical support beam attachment section configured to receive the one or more vertical support beams; and
a plurality of receptacles each being attachable to a corresponding one of the receptacle notches of the hemispherical base,
wherein each of the plurality of receptacles includes:
an elongate primary wall configured to make primary contact with a corresponding receptacle notch from among the plurality of receptacle notches;
a first sidewall including a through hole;
a second sidewall extending from the first sidewall; and
a third sidewall including a rectangular opening, and extending from the second sidewall.

7. A multi-rotor aircraft, comprising,
a base platform;
a plurality of arms extending radially from the base platform;
a plurality of propeller motors each coupled to a corresponding one of the arms;
a plurality of propellers each coupled to a corresponding one of the propeller motors;
a gimbal coupled to the base platform;
one or more vertical support beams coupled to the gimbal; and
one or more hemispherical attachment assemblies coupled to the one or more vertical support beams, wherein:
the gimbal includes a first bracket coupled to a first gimbal motor, and a second bracket coupled to a second gimbal motor;
the one or more vertical support beams include an upper vertical support beam coupled to the first bracket of the gimbal, and a lower vertical support beam coupled to the first bracket of the gimbal; and
the one or more hemispherical attachment assemblies includes an upper hemispherical attachment assembly coupled to the upper vertical support beam, and a lower hemispherical attachment assembly coupled to the lower vertical support beam,
wherein the first gimbal motor is configured to rotate the first bracket and tilt the first vertical support beam and the second vertical support beam in a first or second direction;
wherein the second gimbal motor is configured to rotate the second bracket and tilt the first vertical support beam and the second vertical support beam in a third or fourth direction;

each of the one or more hemispherical attachment assemblies further comprises:
a hemispherical base including a plurality of receptacle notches; and
a plurality of receptacles each being attachable to a corresponding one of the receptacle notches of the hemispherical base; and
each of the plurality of receptacle notches includes:
a primary contact surface configured to make primary contact with a corresponding receptacle from among the plurality of receptacles;
a radial sidewall extending in substantially a radial direction from a center region of the hemispherical base;
an inner sidewall extending from the radial sidewall; and
an outer edge defining an outer perimeter of the primary contact surface.

8. The multi-rotor aircraft of claim 7, wherein the first bracket is disposed within the second bracket.

* * * * *